Figure 3A:
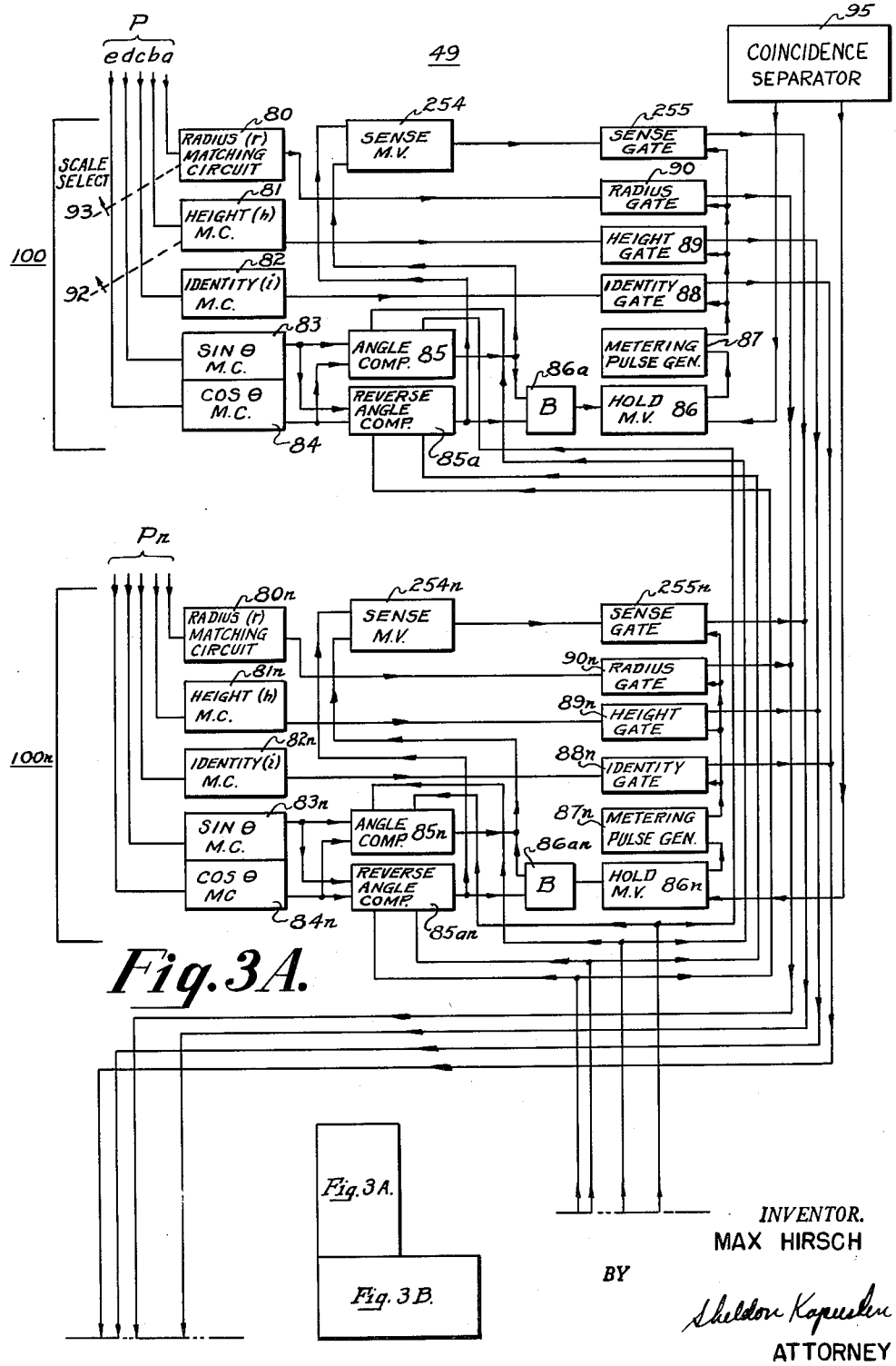

April 11, 1961    M. HIRSCH    2,979,561
THREE DIMENSIONAL DISPLAY APPARATUS
Filed Nov. 12, 1958    10 Sheets-Sheet 1
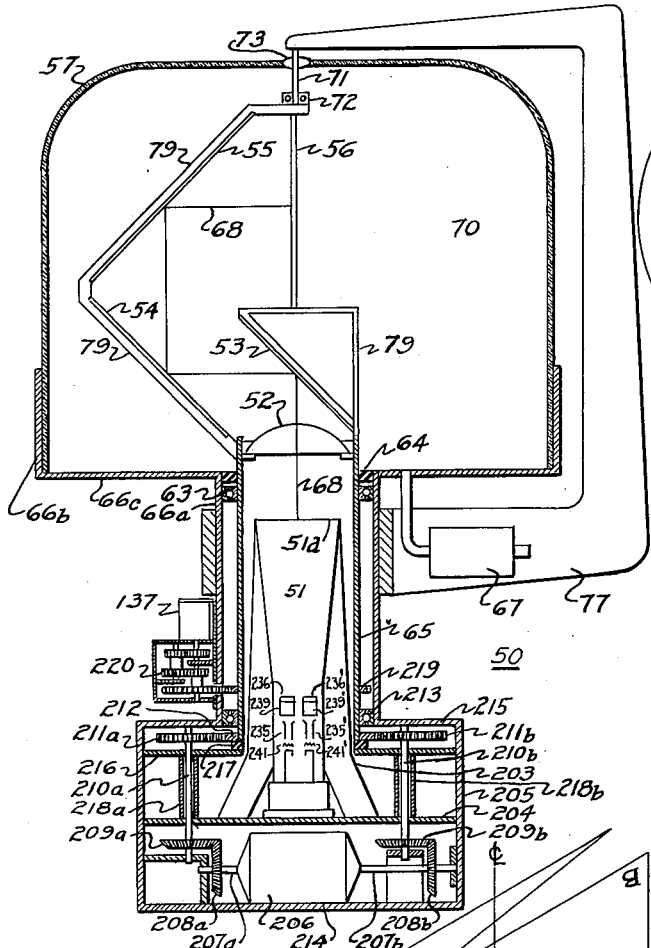
*Fig.2A.*
*Fig.2B.*
*Fig.1.*
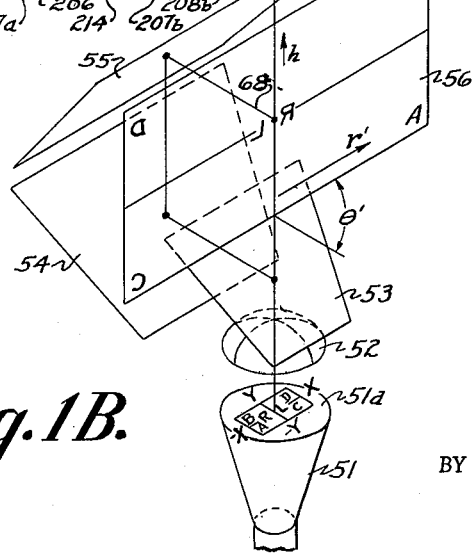
*Fig.1B.*
INVENTOR.
MAX HIRSCH
BY
Sheldon Kapustin
ATTORNEY

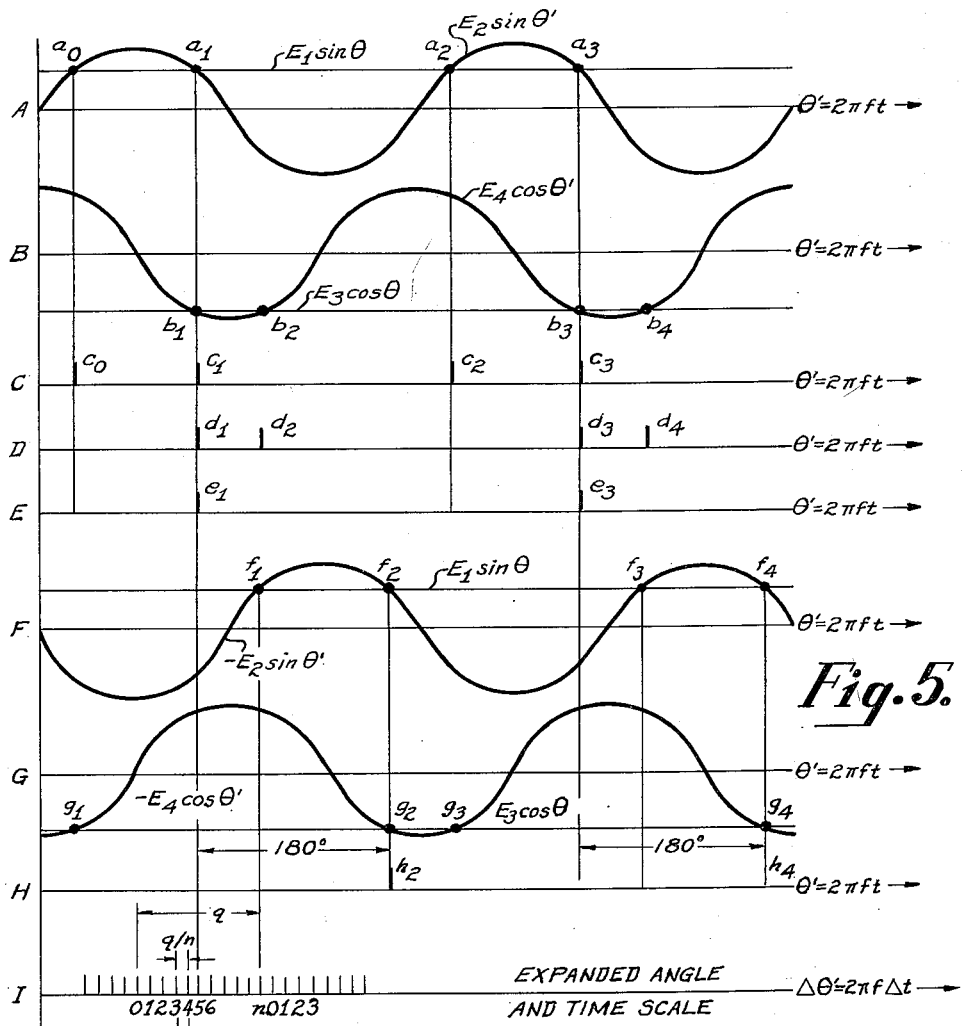
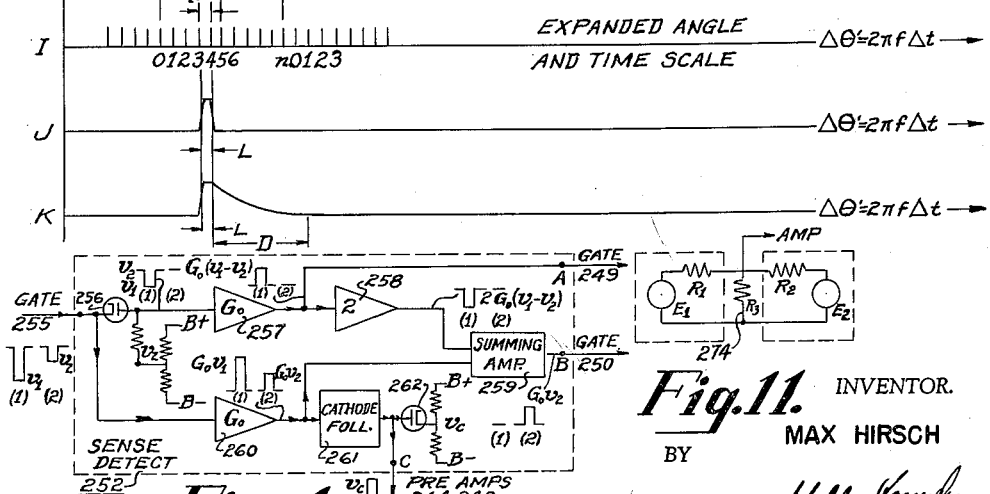
Fig. 5.
Fig. 4.
Fig. 11.
INVENTOR.
MAX HIRSCH
BY
ATTORNEY

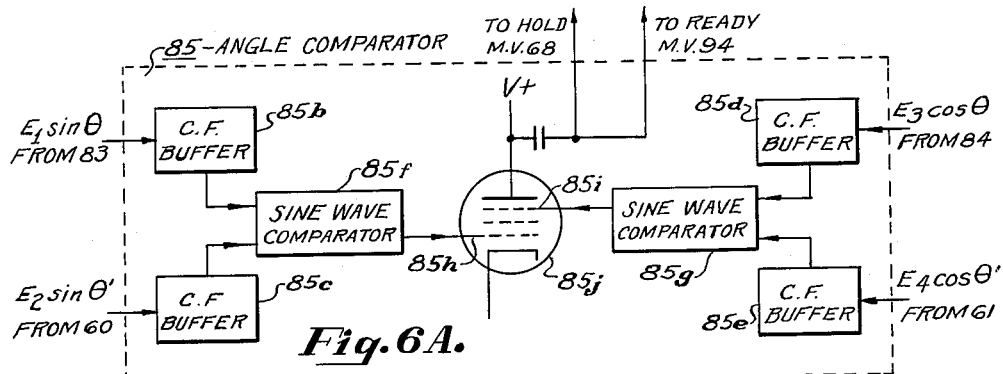
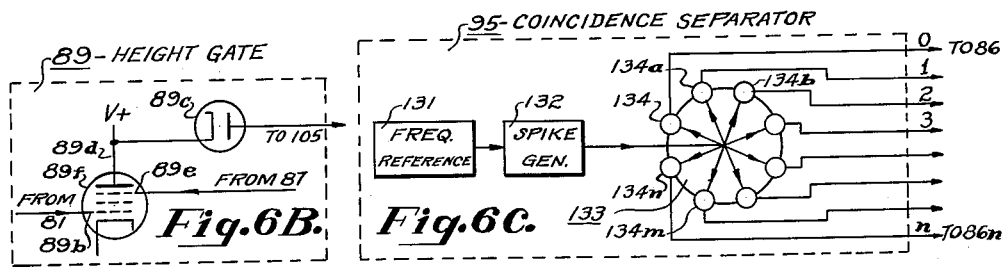
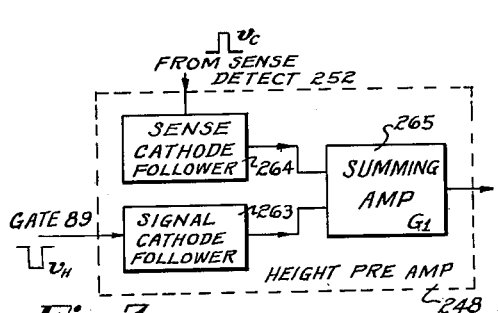
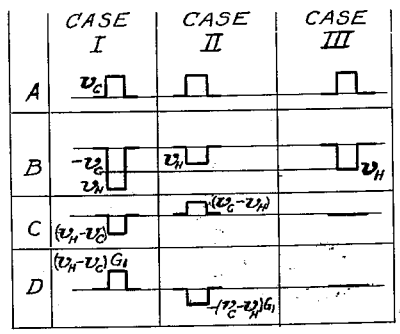
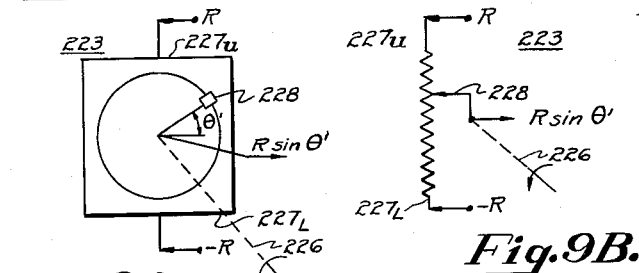
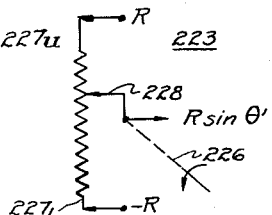

April 11, 1961 M. HIRSCH 2,979,561
THREE DIMENSIONAL DISPLAY APPARATUS
Filed Nov. 12, 1958 10 Sheets-Sheet 6
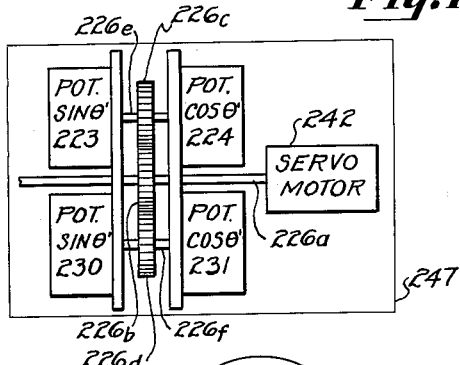
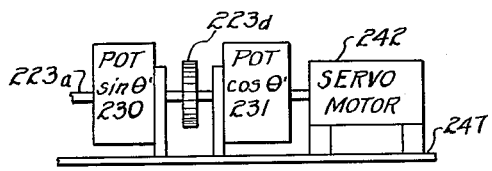
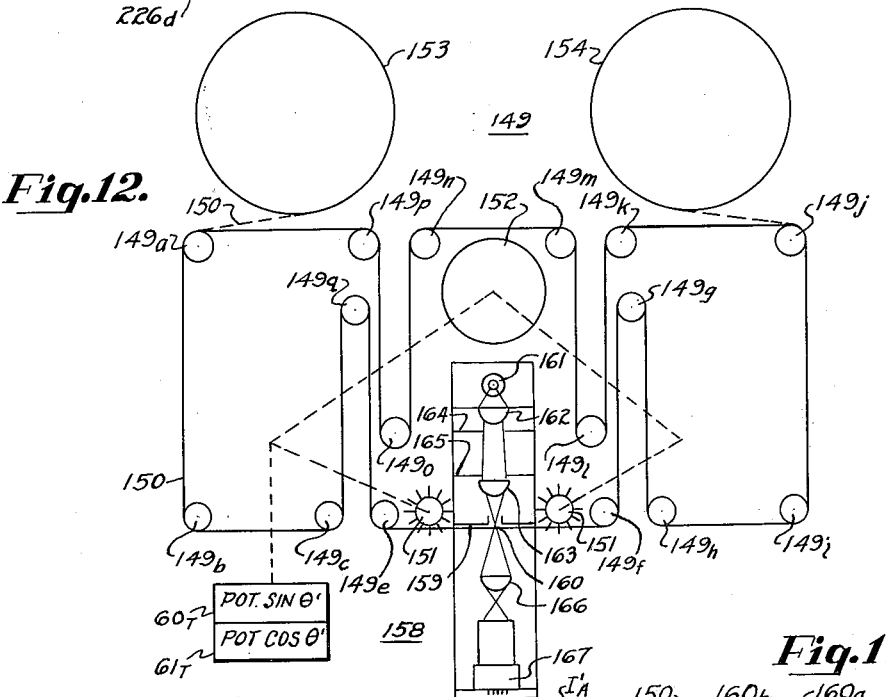
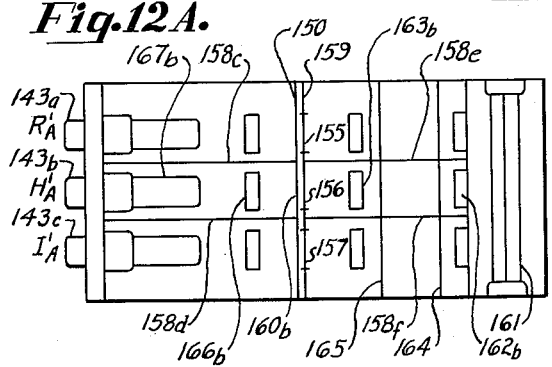
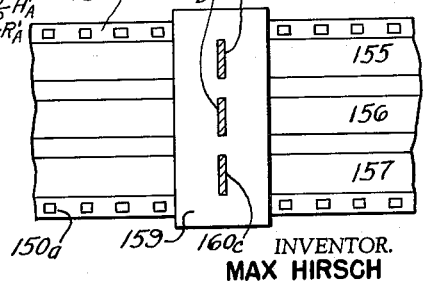
INVENTOR.
MAX HIRSCH
BY
ATTORNEY April 11, 1961 M. HIRSCH 2,979,561
THREE DIMENSIONAL DISPLAY APPARATUS
Filed Nov. 12, 1958 10 Sheets-Sheet 7
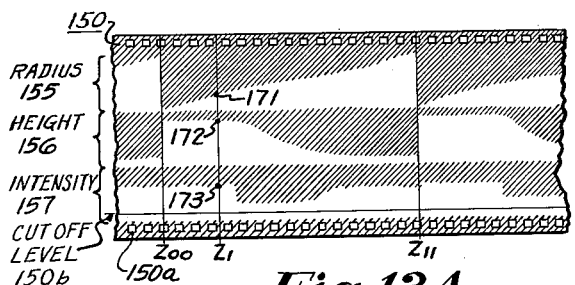
Fig.13A.
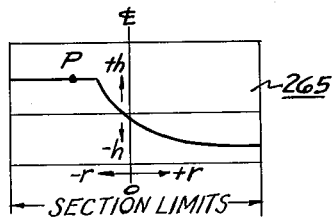
Fig.13B.
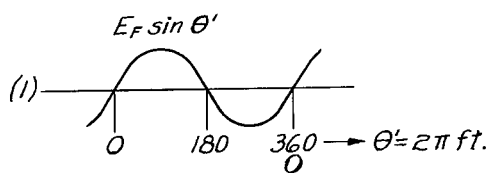
Fig.14.
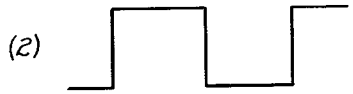
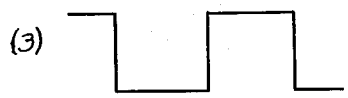
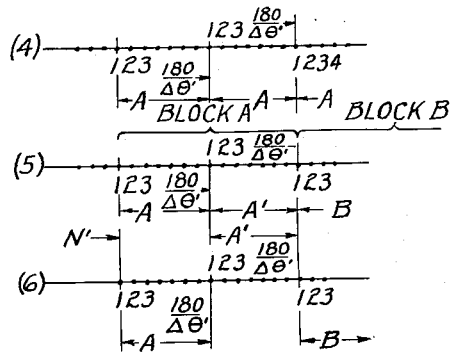
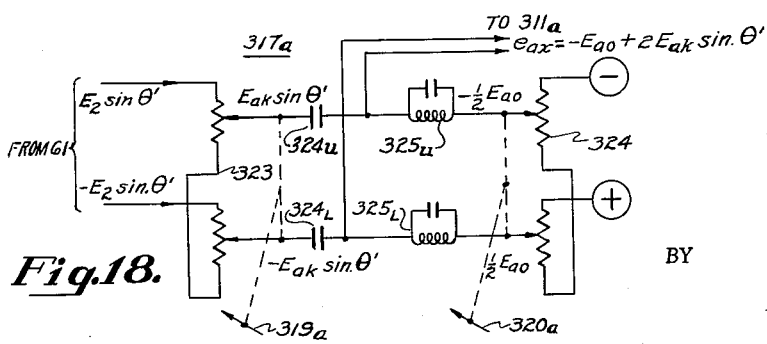
Fig.18.
INVENTOR.
MAX HIRSCH
BY
ATTORNEY April 11, 1961 M. HIRSCH 2,979,561
THREE DIMENSIONAL DISPLAY APPARATUS
Filed Nov. 12, 1958 10 Sheets-Sheet 8
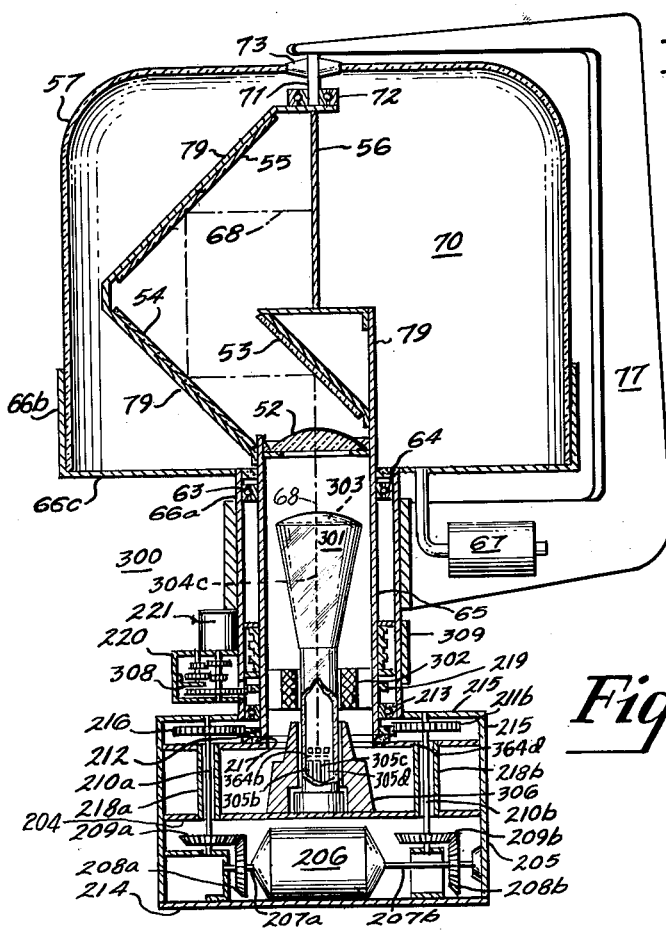
*Fig.15.*
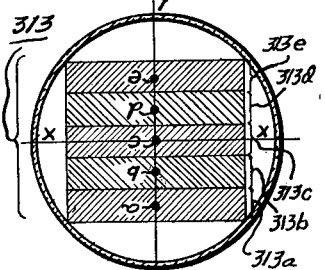
*Fig.16F.*
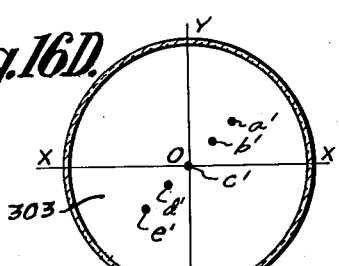
*Fig.16D.*
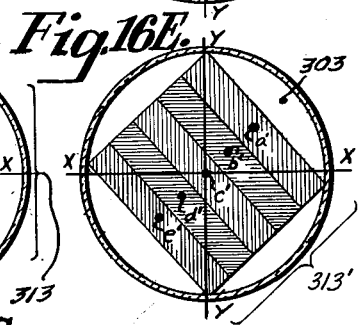
*Fig.16E.*
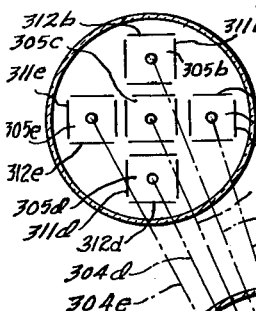
*Fig.16A.*
*Fig.16C.*
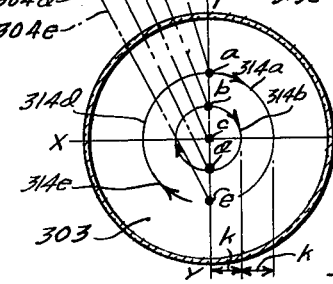
*Fig.16B.*
INVENTOR.
MAX HIRSCH
BY
*Sheldon Kipnis*
ATTORNEY.

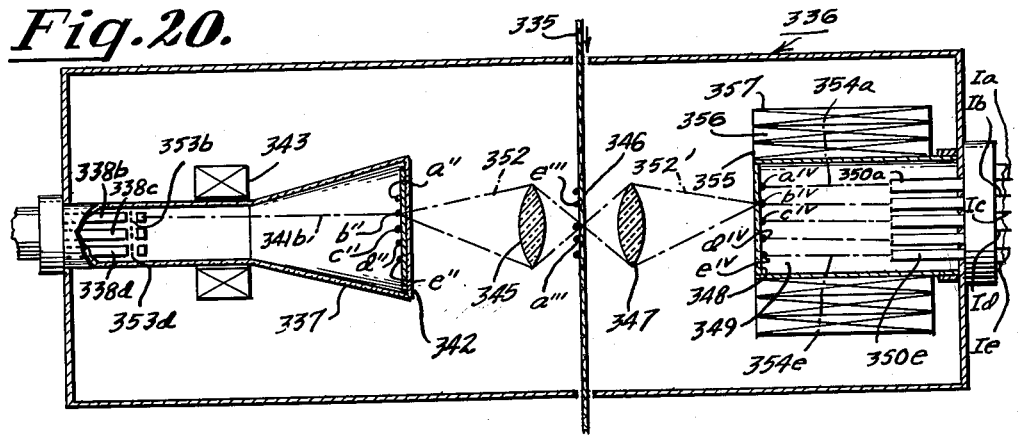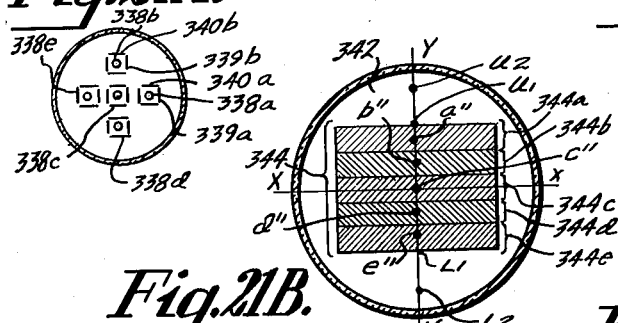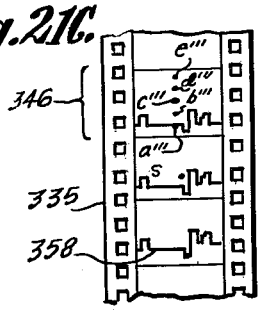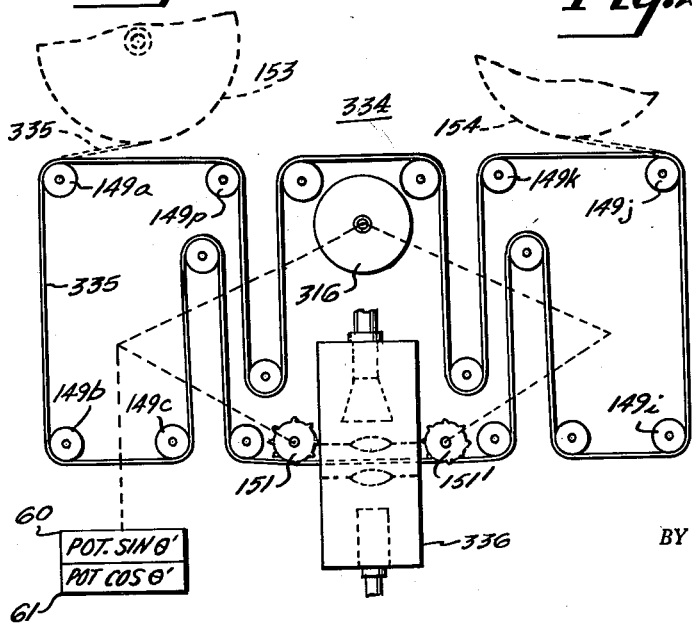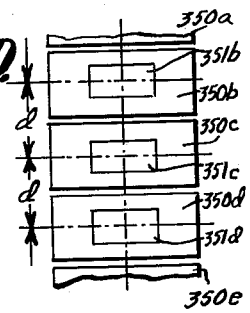

2,979,561

THREE DIMENSIONAL DISPLAY APPARATUS

Max Hirsch, 4810 N. 11th St., Philadelphia 41, Pa.

Filed Nov. 12, 1958, Ser. No. 773,400

29 Claims. (Cl. 178—6.5)

This invention relates to an improved means for presenting images that are reproductions in three dimensions of scenes, solid objects, and arrays of points in space. More particularly, this invention relates to an improvement in the apparatus disclosed in my co-pending application filed January 13, 1958, Serial Number 708,474, entitled "Three Dimensional Display Apparatus," and is a continuation in part thereof.

The representation of scenes by models, solid objects by sculpture, of surfaces by semi-relief sculpture, and of arrays of points in space by mechanical models has been long known. The art of forming two dimensional images by photographic and electronic techniques has been well developed and this art has been extended to give the perception of a third dimension by means of stereoscopy. Attempts have been made to generate true three dimensional images, for example, as taught in the Ferrill Patent No. 2,361,390 and the Marx Patent No. 2,543,793, whereby sections of a solid image are displayed on a screen. These patents disclose apparatus for displaying an image on a screen (or screen elements) which was cyclically moved with effective linear displacement.

This invention employs the principle of forming and displaying a sequence of two dimensional images of sections of a solid on a screen which is rotated to sweep out a volume at such a rate that the persistence of vision gives the perception of a sustained solid or three dimensional images, that may have color and motion. Furthermore, in the preferred embodiment of this invention, the screen is substantially parallel to the axis of its rotation. The advantages of this arrangement are that the screen may be of such form that convenient sections (e.g. diametrical sections) of the solid can be displayed thereupon, large volumes can be swept out, and the forces caused by the cyclic motion of the screen can be made constant. Another important aspect of this invention not found in the prior art is that new and superior means are provided for good definition of the displayed solid image compatible with the short time available for the display of sequential sections of the image comprising the entire solid. A device for displaying three dimensional views of solids or volumes may be called a generescope, since the displacement of a series of two dimensional images generates solid or three dimensional images.

The apparatus previously disclosed in one embodiment of my parent application, referred to above, employed a rotatable two dimensional image forming means which took the form of a single gun cathode ray tube. Images formed on this rotatable cathode ray tube were transmitted by a rotatable projection apparatus onto a screen rotating in synchronism with the projection apparatus and the cathode ray tube. One of the improvements disclosed herein allows the cathode ray tube to remain physically stationary and provides electrical means for rotating the image formed on its face in synchronism with the movement of the screen and projection apparatus. In particular, there is disclosed in this embodiment, a computing means which forms a part of the three dimensional display apparatus for automatically rotating the images on the face of the cathode ray tube in synchronism with the rotation of the viewing screen and the means for projecting images from the face of the cathode ray tube onto that screen.

In a second embodiment of this invention the need for a computing means is obviated. Instead, a rotating magnetic deflection element is employed to rotate the images on the face of the cathode ray tube in synchronism with the viewing screen. Further, in both described embodiments of this invention, the cathode ray tube employed may have a plurality of electron guns to allow for an increased rate of data presentation.

The information or data signals for the three dimensional images may originate in many ways such as a sensing means in the nature of a radar device, direction finders and generating means such as electronic computers and electrical function generators; but in any case the data signals must be synchronous or made synchronous with the screen movement which displays the solid image. Further, the information may be derived from a moving film source, as shall be disclosed in particular. By using the time sharing techniques and a plurality of data sources, information of different content and from different sources may be displayed within a single three dimensional image to give an effect similar to superimposing in photography.

The objects of this invention are many and those mentioned may be considered a typical category. One object of this invention is to provide an improved means for presenting three dimensional presentations.

Another object is to provide an improved means for displaying three dimensional images comprising a rotating screen and image projecting apparatus, and a stationary cathode ray tube.

Another object of this invention is to provide an improved means for displaying three dimensional images comprising a rotatable viewing screen and image projection apparatus, a stationary cathode ray tube, and computing means for rotating the images on the face of the stationary cathode ray tube in synchronism with the rotation of the screen and projection apparatus.

Another object of this invention is to provide an improved means for displaying three dimensional images comprising a rotatable viewing screen and image projection apparatus, a stationary cathode ray tube and a rotating magnetic deflection element therefor.

Yet another object of this invention is to provide an improved means for displaying images comprising a multiple-gun cathode ray tube.

Still another object of this invention is to provide a new and improved means for displaying information comprising a cathode ray tube wherein the data displayed by said tube are determined by signals applied to the deflection elements of said tube.

Another object of this invention is to provide an apparatus for displaying images comprising a new and improved moving film source of data and a transducer therefor.

Another object of this invention is to provide a new transducer having a plurality of scanning elements and detection elements to be used in conjunction with a film storing data for converting said data into electrical signals.

Another object of this invention is to provide a new and improved display apparatus for producing three dimensional images which are functions of data contained on a moving film and for displaying points within the said three dimensional images.

The specific descriptions of the embodiments of this invention illustrate the principle on which it is founded more fully, and suggest other objects and uses. It is to be expressly understood, however, that the embodiments of the invention disclosed herein are meant to be illustrative only of the mechanisms employing the principles of the invention, and serve as a teaching for any equivalent elements that could be used in the described structures. Referring now to the drawings that form a part of this disclosure, there is shown in:

Fig. 1, a cross-sectional view of a multiple-electron gun fixed cathode ray tube projection rotary type three dimensional display assembly or generescope.

Fig. 1B, an isomeric view of the optical system.

Fig. 2A, references axis on the phosphor screen of the cathode ray tube when $\theta^1 = \theta$.

Fig. 2B, same as Fig. 2A when $\theta^1 = \theta + 180°$.

Figure 3B:
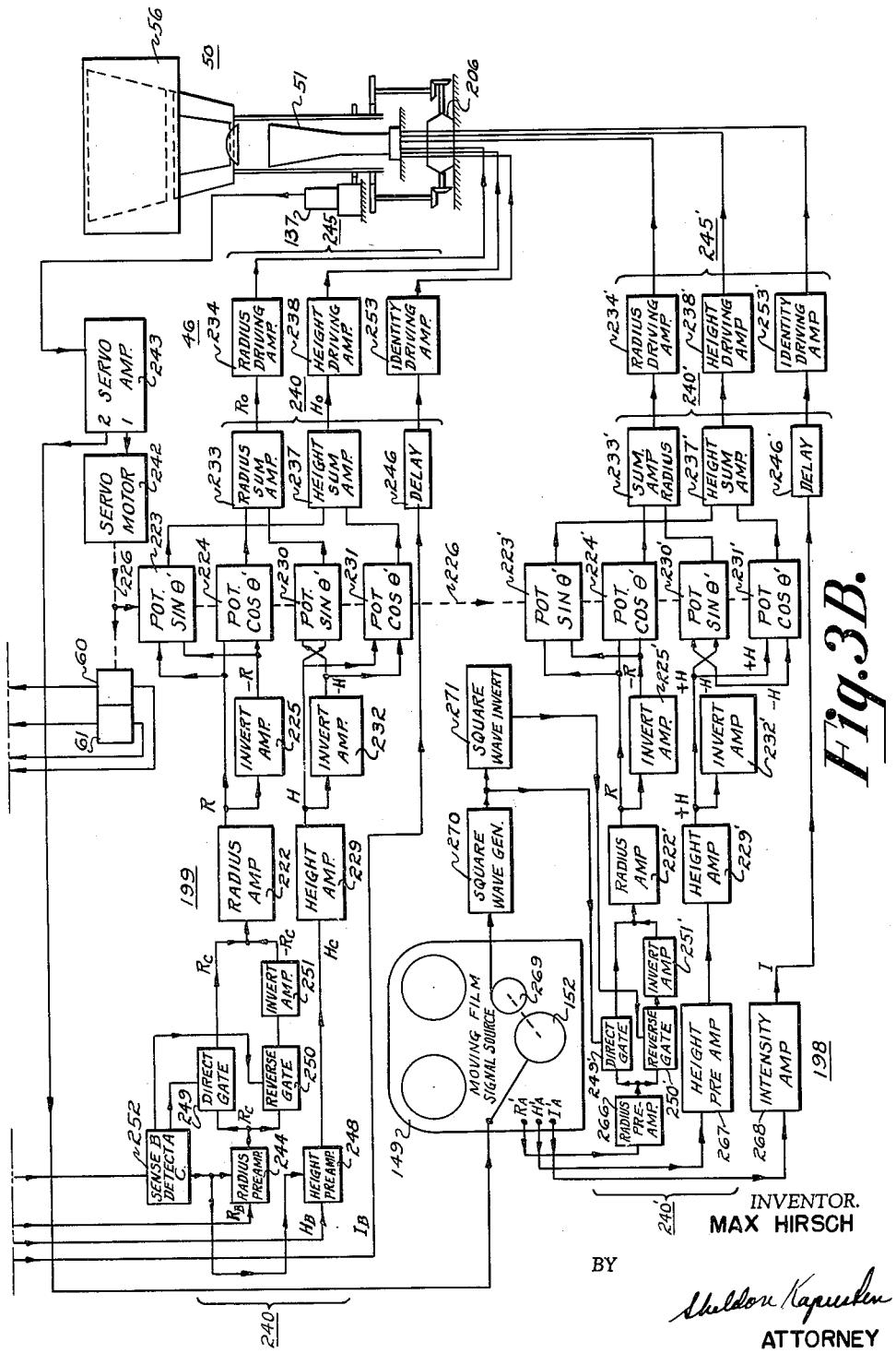

Figs. 3A and 3B, a block diagram of the circuits used in conjunction with the apparatus of Fig. 1.

Fig. 4, a schematic diagram of the sense detect element.

Fig. 5, waveforms associated with the circuits of block diagram of Fig. 3.

Fig. 6A, basic diagram of an angle comparator.

Fig. 6B, basic diagram of a height gate.

Fig. 6C, basic diagram of a coincidence separator.

Fig. 7, a block diagram of a height preamplifier.

Fig. 8, waveforms of voltages in the height preamplifier under different conditions.

Fig. 9A, representation of the mechanism of sin $\theta'$ potentiometer multiplier.

Fig. 9B, electrical diagram of sin $\theta'$ potentiometer multiplier.

Fig. 10A, top view of servo motor, mechanical linkage, and potentiometers.

Fig. 10B, side view of servo motor, mechanical linkage, and potentiometers.

Fig. 11, schematic representation of summing amplifier input circuit.

Fig. 12, moving film record-signal producer.

Fig. 12A, top view of an optical transducer used with apparatus of Fig. 12.

Fig. 12B, front view of mask used in optical transducer.

Fig. 13B, sectional view of a unified scene.

Fig. 13A, variable area record photographic film strip.

Fig. 14, sense waveforms and the number of the field of the film record entering the optical transducer.

Fig. 15, a sectional view of a multiple-electron-gun, fixed-cathode ray tube, projection, rotary type three dimensional display assembly (generescope) employing rotary magnetic deflection means.

Fig. 16A, a top view of the base of the projection cathode ray tube showing the relative positions of its electron guns and their alignment-rotation electrodes.

Fig. 16B, relative spot positions of electron beams on the face of the projection cathode ray tube—no magnetic deflection—screen angle zero.

Fig. 16C, zonal swept areas on the face of the projection cathode ray tube—screen angle zero.

Fig. 16D, same as Fig. 16B—screen angle forty-five degrees.

Fig. 16E, same as Fig. 16C—screen angle forty-five degrees.

Fig. 16F, same as Fig. 16C—screen angle 180 degrees.

Figure 17:
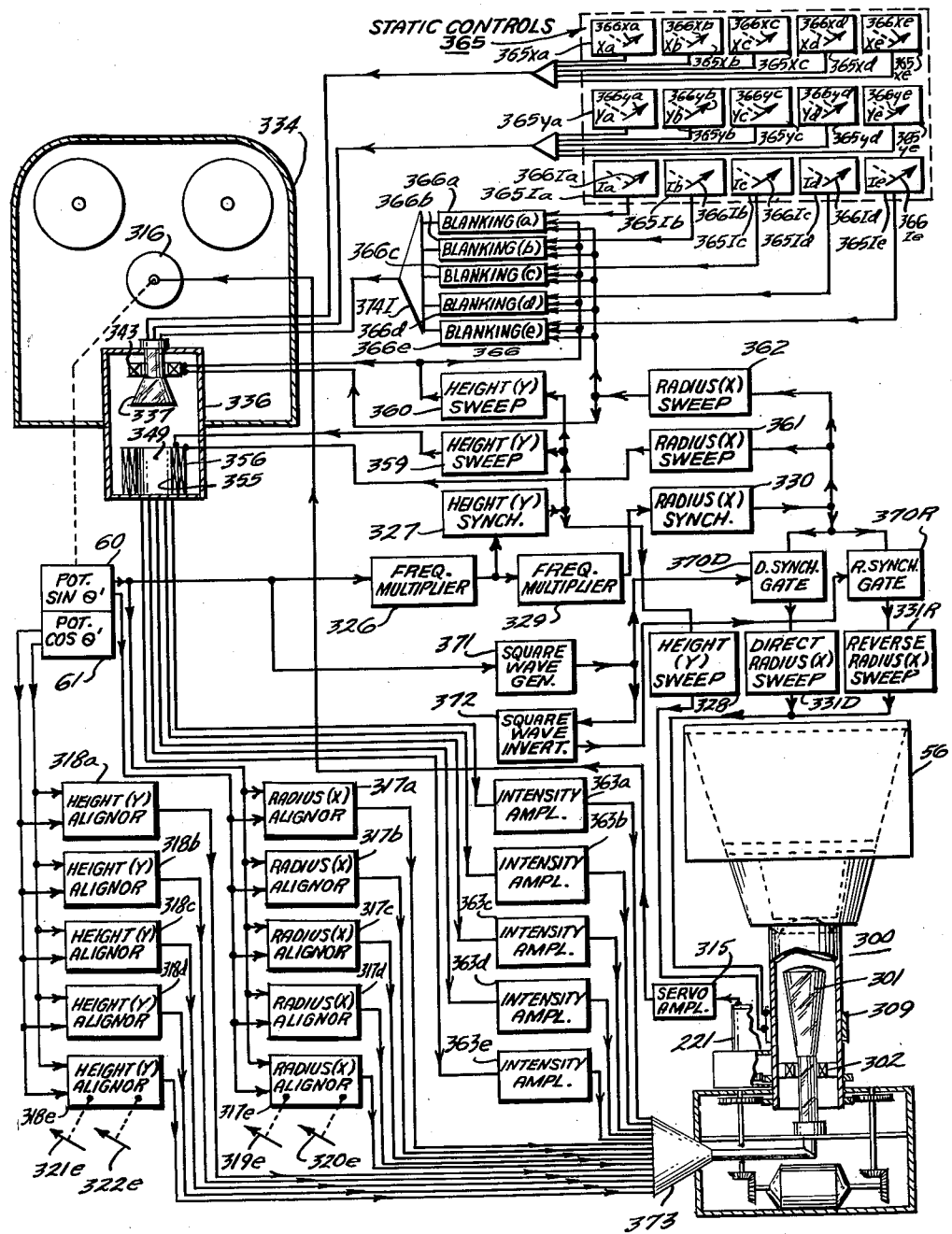

Fig. 17, a block diagram of circuits used in conjunction with the apparatus of Fig. 15 and Fig. 19.

Fig. 18, schematic diagram of radius alignor circuit.

Fig. 19, moving film reproducer—a cross sectional diagram.

Fig. 20, moving film transducer—a cross sectional diagram.

Fig. 21A, a top view of the base of a flying spot scanner cathode ray tube showing the relative position of its electron guns and their aligning electrodes.

Fig. 21B, zonal swept areas on the face of the flying spot scanner cathode ray tube—frame position, slightly below center.

Fig. 21C, broad view of film showing point positions and panorama sections on frames.

Fig. 21D, front view of electron gun of image dissector tube.

Referring now to Fig. 1, there is shown a display apparatus 50 for presenting a three dimensional image to an observer comprising a multiple electron-gun cathode ray tube 51, lens 52, mirrors 53, 54, and 55 and a rear projection screen 56 arranged and mounted such that elements 52 to 56 rotate together and that an image formed on the face 51d of cathode ray tube 51 is projected onto the rear projection screen 56. A central ray of light 68 emanating from a central point of the face 51d of the cathode ray tube 51 illustrates this projection. The cathode ray tube 51 is supported by an extended structure 203 that grips it over a considerable portion of its surface. Cathode ray tube 51 and structure 203 rest on stationary plate 204. This plate 204 is rigidly connected to the cylindrical housing member 205 so that cathode ray tube 51 is rigidly fixed in position and does not rotate. Images formed on the cathode ray tube face 51d are rotated in unison with the rotation of optical elements 52 to 56 by electrical methods to be described. Cylinder 65 and structure 79, which support optical elements 52 to 56, are rotated by a mechanism also to be described later.

Structure 79 in its upper section consists of a periscope-like arrangement on which mirrors 54 and 55 are mounted. The lower section of structure 79 supports mirror 53 and lens 52 and contains an aperture for the transmission of light from mirror 53 to mirror 54. The rear projection screen 56 is mounted between the two aforementioned sections of structure 79. Cylinder 65 and structure 79 are supported by bearing 63, bearing 213, and constrained by bearing 72. The assembly of support structure 79, hollow tube 65, and the optical elements 52–56 rigidly attached therein are driven by motor 206 via gearing arrangement (to be described later) so that lens 52, mirrors 53, 54, and 55, and screen 56 all rotate in unison; whereas cathode ray tube 51 remains fixed in position.

The basic supporting structure for the display apparatus 50 is the rigid housing that consists of a long hollow cylinder 66a and shorter but broader cylinder 66b connected by an annular plate 66c. A rigid arm 77 attached to housing 66a has a fixed shaft 71 that fits into a bearing 72. Bearing 72 keeps the rotating assembly of structure 79 and 65 aligned with supporting arm 77 and cylinder 66a. While this rotating system is not symmetrical, it can be balanced by well known methods.

The display chamber 70 containing the rear projection screen 56 is partially enclosed by transparent cover 57, through which the display on screen 56 can be observed. The broad cylinder 66b and the annular ring 66c enclose most of the remaining portion of the display chamber 70.

Chamber 70 can be made airtight. Thus, lens 52 is sealed within structure 79 and a rotary seal 64 is inverted between support member 79 and structure 66a. Seal 73 which bonds transparent cover 57 to shaft 71 completes the airtight enclosure. Seal 73 also serves an additional function since it acts as a vibration insulator. A pneumatic exhaust pump 67 mounted on arm 77 and coupled to chamber 70 keeps the chamber 70 at reduced air pressure, relieving the screen 56 and structure 79 of air loading, thereby lowering the drag on motor 206.

The apparatus for rotating cylinder 65, structure 79, and elements 52 to 56 comprise an electrical motor 206, which through shafts 207a and 207b at each end thereof, drives bevel gears 208a and 208b respectively. Bevel gears 208a and 208b rotate bevel gears 209a and 209b respectively, which in turn drive their shafts 210a and 210b. Gears 211a and 211b are rigidly attached to their respective shafts 210a and 210b, and transmit the motion they receive to ring gear 212 which is rigidly attached to cylinder 65. The double or balanced drive system comprising elements 206 to 212 inclusive applies a pure couple to the drive cylinder 65. This obviates the application of a balancing force by bearing 213 which supports and constrains cylinder 65. The drive system is basically supported by the lowest housing member 205, the base plate 214 to which it is attached at its lower end, and the lower annular plate 215 to which it is attached at its upper end. This plate 215 is attached at its inner perimeter to hollow housing cylinder 66a.

Seal plate 216, an annular ring, together with seal 217, seal 64, hollow housing cylinder 66a and rotating optical support cylinder 65 form an enclosure for the major mechanical friction generating elements of generescope 50 such as gears 211a, 211b, 212, bearing 213, etc. Cathode ray tube support plate 204, base plate 214, and a section of the lowest housing member 205 form an enclosure for the motor 206 and the lower elements of the gear train, i.e., bevel gears 208a, 208b, 209a, 209b, etc. Tubes 218a and 218b enclose the rotating shafts 210a and 210b respectively.

An accurate ring gear 219 is rigidly mounted on rotating cylinder 65. Gear 219 drives a gear train 220 that transmits the rotation of cylinder 65 to servo generator 137 and is so proportioned that the angular displacements of the cylinder 65 and the armature (not shown) of the servo generator 137 are equal. Servo generator 137 controls servo amplifier 243 which in turn drives servo motor 242 as shown in Fig. 3. Servo motor 242 is linked to and thus drives sine and cosine potentiometers 60 and 61 respectively, also shown in Fig. 3. These potentiometers 60 and 61 are each equipped with two rotatable arms so that potentiometers 60 and 61 furnish voltages which are representative of plus and minus the sine and cosine of the angle (hereinafter designated $\theta'$) of the cylinder 65 and consequently screen 56 at any instant.

Referring still to Fig. 1, it can be seen that a spot of light produced on the screen 51d of cathode ray tube 51 is projected onto the rear projection screen 56 so that any position of the spot on the screen 51d of the cathode ray tube 51 has a unique corresponding position on the rear projection screen 56 that is not affected by rotation. This is true as all the optical elements 51–56 of the display apparatus (generescope) 50 effectively maintain a fixed spatial relationship with respect to each other, since it will be shown that images on the face of cathode ray tube 51 are electrically rotated in synchronism with lens 52, mirrors 53 to 55 and screen 56. When a spot of light shines continuously at a given position on the rear projection screen 56 and that screen is rotated at about 20 cycles per second or more, persistence of vision will give the effect of a continuous circular ring of light whose center is on the axis of rotation of the screen. When the spot is luminous only at a given phase in the cycle of rotation and for a period that is a fraction of the cycle, the circular ring of light reduces to a circular segment whose length may be further reduced so that it effectively constitutes a spot of light in space. The position of the spot of light is uniquely determined by the phase, $\theta'$, in the cycle of rotation of the screen that the spot is luminous and its position on the rear projection screen 56, which may be expressed as $r'$, the radial distance perpendicular to the axis of screen rotation and $h'$, the distance along the axis of screen rotation. The coordinates $r'$, $h'$, $\theta'$ are cylindrical and $r'$, $h'$ on the rear projection screen are a projection of the usual $(x, y)$ coordinates on the screen 51d of the cathode ray tube 51.

A given spot of light on the screen 51d of cathode ray tube 51, having particular coordinates $(x, y)$ may be projected onto screen 56 so as to have corresponding coordinates $(r', h')$. This spot of light on screen 56 may be seen from a wide angle in front of the screen. When the optical elements 52–56 are rotated 180 degrees mechanically and the image on the screen 51d of cathode ray tube 51 is rotated 180 degrees electrically, a spot of light may again be projected on screen 56 to have the same coordinates $(r', h')$, if the original spot of light on the screen 51d is electrically displaced so that it now has coordinates $(-x, y)$. This second luminous spot on screen 56 has the same physical position as the first and may again be seen over a wide solid angle, but this time from a direction to the rear of the original position of the screen 56. The projected image on screen 56 of a display fixed on the face of cathode ray tube 51 is thus reverted, that is, the horizontal and only the horizontal $(x)$ coordinate of the image is reversed when screen 56 and all the rest of optical elements 52 to 55 are rotated 180 degrees mechanically and the image on the face of cathode ray tube 51 is rotated 180 degrees electrically. The electrical displacement of a spot of light on the screen 51d of cathode ray tube 51 from $(x, y)$ to $(-x, y)$ effects a reversion, so that the coordinates of the displaced spot is $(r', h')$ for both the original position of the screen 56 and its rotated position 180 degrees removed.

The action described for a single point applies to an array of points constituting a two dimensional image. Every two dimensional image is displayed twice in every cycle of rotation, once as a direct image, and the second time as a reverted image, but since each of these images are visible from opposite directions, only one image is visible from a given direction. The total effect is that every position upon which a spot of light may be projected in the volume swept out by the screen 56 may be seen, and consequently the part of the structure 79 that supports mirrors 54 and 55 does not effectively obscure any part of the whole displayed solid image. It may be noted that when the eye of the observer is in the extension of the surface of screen 56, a luminous spot on the screen at that time is not distinctly visible. However, since the observer may employ both eyes and move his head, even this restriction may be minimized.

The position of points or aircraft in space may be simulated by various generating means or they may be sensed by radar, radio direction finding, theodolite observation, etc. In any case, the data representing the attributes of point in space may be presented as height above a given level $(h)$, distance along a given level from a given point $(r)$, and angular bearing $(\theta)$ with respect to some given origin. The three variables $r$, $h$, and $\theta$, or coordinates, uniquely determine the position of a point in space. A corresponding spot of light of short duration projected onto rotating screen 56 within display chamber 70 of the display assembly 50 shown in Fig. 1 representative of the position of the aforementioned point in space, would have coordinates $(r', h', \theta')$, where $\theta'$ is the angular value of the screen. Accordingly, the bearing angle of the spot of light, $\theta'$, $r'$, and $h'$ are the coordinates in the display chamber 70 corresponding to the spacial coordinates $\theta$, $r$, and $h$ respectively of a point in space.

To the three coordinates mentioned, a fourth $(i)$ may be added which identifies the target or indicates the value of some field (or some variable quantity in space) such as brightness, potential, temperature, target size at a given position. Thus four variables $(r, h, i, \theta)$ can be presented in the display system. While the description that follows explicitly concerns itself with these four variables, a fifth variable, time is implicitly involved. The displayed discrete spots can move and their motion can be observed. And, therefore, the fifth variable, time is also displayed.

Generescope 50 is similar in many ways to the first generescope described in my aforementioned parent application. As described there, two dimensional images formed on the face of a rotatable cathode ray tube are projected onto a rear projection screen. However, in this invention, the cathode ray tube 51 and its deflection elements 235, 235', 239 and 239' are fixed while the rear projection screen 56 rotates. In the earlier generescope, the cathode ray tube rotated with the images formed on its phosphor screen. In this invention, the image is effectively rotated on phosphor screen 51d in unison with rear projection screen 56 by computing the appropriate electrical signals from data signals defining the position of image points.

As previously described, a point in space having coordinates $(r, h, \theta)$ when represented in the three dimensional display in display chamber 70 (Fig. 1) has the coordinates $(r', h', \theta')$. It may be seen from Fig. 1B that the coordinates $(r', h')$ are an optical projection of the coordinates $(x, y)$ at all times if the reference frame X—Y on phosphor screen 51d rotates in unison with rear projection screen 56. Refer to Fig. 2A showing the reference frames on phosphor screen 51d in detail. The convention is adopted that coordinates $(x_0, y_0)$ refer to fixed reference frames $X_0$—$Y_0$, the reference frame when $\theta'=0°$, and coordinates $(x_\theta, y_\theta)$ refer to rotating reference frame $X_\theta$—$Y_\theta$. The deflection systems comprising cathode ray tube elements 235 and 239 as well as 235' and 239' (Fig. 1) produce deflections parallel to reference frames $X_0$—$Y_0$. The coordinates $(x_0, y_0)$ are computed from the coordinates $(x_\theta, y_\theta)$ and the sine and cosine of $\theta'$, i.e., $x_0 = x_\theta \cos \theta' - y_\theta \sin \theta'$ and $$y_0 = y_\theta \cos \theta' + x_\theta \sin \theta'$$

Refer now to Figures 2A, 2B, and 3. Each section, 240 or 240' of computer 199 accepts a pair of data signal corresponding to $(x_\theta, y_\theta)$ when $\theta'=\theta$ and forms electrical signals corresponding to $(x_0, y_0)$ to effect rotation of an image point. When $\theta'=\theta+180$ degrees, each section 240 (or 240') again accepts the signals corresponding to $(x_\theta, y_\theta)$ but reverts them to signals corresponding to $(-x_\theta, y_\theta)$ and then forms electrical signals corresponding to $(x'_0, y'_0)$ from these reverted signals for the angle $\theta'=\theta+180°$. Fig. 2B shows the rotating reference frame at $\theta+180°$. The $(x'_0\ y'_0)$ indicate that the coordinates are taken with respect to $X_0$—$Y_0$ axis: the primes indicate $\theta'=\theta+180°$. This computation by computer 199 effects reversion as well as rotation to satisfy the requirements previously mentioned. A more detailed description of computer 199 is given below.

Refer again to Fig. 3 which shows a block diagram of an embodiment of this invention. The synchronous sampling circuits 49 comprising several point channels 100 to 100n supply data pulse signals to portion 245 of amplifiers 46 via one section 240 of computing circuit 199 for the display in generescope 50 of a three dimensional array of discrete images that represent points or objects in space.

Synchronous sampling circuits 49 require that five sustained data voltages be supplied to each of the point channels 100 to 100n to represent the coordinates or other attributes of each point or target to be exhibited. These sustained voltages are designated as follows;

(1) A voltage ($R_A$) on line a, corresponding to the range, $r$, of the target.

(2) A voltage ($H_A$) on line b, corresponding to the height, $h$, of the target.

(3) A voltage ($I_A$) on line c, corresponding to the magnitude or representing the identity of the target. (While only one such voltage is used here, several might be employed for more precise identification.)

(4) A voltage ($E \sin \theta$) on line d, proportional to the sine of the bearing angle of the target.

(5) A voltage ($E \cos \theta$) on line e, proportional to the cosine of the bearing angle of the target.

The data voltages designated $E \sin \theta$ together represent unambiguously the bearing angle of the target.

The five data voltages are sustained, that is, they vary only with attributes of the target they represent. These control voltages can be continuous, or can vary in steps.

This set of five voltages may be derived from any sensing or generating means such as radars, RF direction finders, sonar, computers, etc. In my copending application Serial No. 708,474 means for generating such sets of five voltages by potentiometers were described.

The synchronous sampling circuits 49 convert the sustained voltage inputs $R_A$, $H_A$ and $I_A$ into pulse signals $R_B$, $H_B$, and $I_B$ respectively, such that the amplitudes of the pulse outputs are proportional to their sustained inputs and this conversion occurs repeatedly when $\theta'=\theta$ and $\theta'=\theta+180°$. A description of the operation of synchronous sampling circuits 49 is given below. The pulse signals $R_B$ and $H_B$ are fed into a section 240 of computing circuits 199 where the signals are manipulated for reversion [$(x_\theta, y_\theta)$ to $(-x_\theta, y_\theta)$ when $\theta'=\theta+180°$] and for rotation [$x_0 = x_\theta \cos \theta' - y_\theta \sin \theta'$ and $y_0 = y_\theta \cos \theta' + x_\theta \sin \theta'$ when $\theta'=\theta$ and again when $\theta'=\theta+180$ degrees]. The output pulses $R_0$ and $H_0$, i.e. the computed signals derived from $R_B$ and $H_B$ by section 240 of computer 199, are fed into section 245 of driving amplifiers 46 along with identification pulse $I_B$ that bypasses the computing circuits. The pulse signals $R_0$, $H_0$, and delayed pulse signal $I_B$ are amplified and fed to deflection electrodes 235, deflection electrodes 239, and intensifying grid 241 respectively (see Fig. 1). Elements 235, 239, and 241 are members of one of the electron guns of cathode ray tube 51.

Moving film source 149 supplies, via another section 240' of computing circuit 199 and portion 245' of amplifiers 46, data representing a plurality of cross sections of scenes to generescope 50. These scenes are also displayed on screen 56. The data for source 149 may be stored on a transparent or translucent film, intelligence being recorded thereon by the well known variable area technique. The two sources 49 and 149 may be used independently or both may supply data to generescope 50 for simultaneous display in the volume swept out by screen 56.

The data on the film from source 149 is transmitted via a delay link 246' and another portion 240' of computing circuit 199 synchronously with the movement of the screen 56. This synchronism is constantly maintained by an electro-mechanical linkage since motor 206 drives the rotary elements of generescope 50 and controls the movement of the film in source 149 through servo amplifier 243. By properly inserting the film in source 149, a desired predetermined relationship between the data on the film being detected by source 149 and the position of the screen is established. This relationship is such that when the screen is at any angle, the data being detected by source 149 from the film therein is the desired data to be displayed on screen 56.

The five voltages $R_A$, $H_A$, $I_A$, $E \sin \theta$, and $E \cos \theta$ determining the position of single points, such as an aircraft are transmitted via lines a to e to the radius matching circuit 80, height matching circuit 81, identity matching circuit 82, sine $\theta$ matching circuit 83, and cos $\theta$ matching circuit 84, respectively, which are part of point channel 100 of synchronous sampling circuits 49. The matching circuits 80 to 84 comprise amplifiers with suitable controls for determining their gain. While the following discussion deals with the display of a single point (representative of the position of an aircraft, etc.) by the circuits shown at 100, it will be understood that all n point channels 100 to 100n operate in a similar manner for other points to be displayed, and may be used to display any n points in space.

Radius matching circuit 80 is connected at its output to the input of radius gate 90. Height matching circuit 81 and identity matching circuit 82 are connected respectively to the inputs of height gate 89 and identity gate 88. Sine and cosine matching circuits 83 and 84 each transmit their sustained sine and cosine voltages to both angle comparators 85 and 85a. These angle comparators each receive another pair of sine and cosine signals from screen angle indicating sine and cosine potentiometers 60 and 61 respectively. When the screen angle is equal, or the reverse screen angle (the screen angle minus 180 degrees) is equal, to the bearing angle of the point, angle comparator 85 or reverse angle comparator 85a respectively is momentarily activated. This action is transmitted to ultimately condition the group of gates 88, 89, 90, and 255 as will be shown. Gates 90, 89, and 88 are constructed so as to convert their sustained input voltages into output pulse type signals $R_B$, $H_B$, $I_B$, whose amplitudes are proportional to their sustained input signals. These amplitude modulated signal pulses, $R_B$, $H_B$, and $I_B$ ultimately are coupled from the outputs of the aforementioned gates 90, 89, and 88 via computing circuits 199 and the set of amplifiers 49 to the deflection elements and control grid respectively of one electron gun in cathode ray tube 51. Consequently, when gates 90, 89, and 88 are conditioned, (i.e. when $\theta=\theta'$), the cathode ray tube 51 displays a spot of light that is projected onto screen 56, the position and intensity of which are thus determined by the original sustained voltages ($R_A$, $H_A$, $I_A$, $E \sin \theta$, $E \cos \theta$).

As shall be described, coincidence separator 95 sweeps the point channels 100 to 100n, in conjunction with hold multivibrators 86 to 86n and metering pulsers 87 to 87n. These elements prevent pulse signals from the several point channels 100 to 100n from interfering with each other at the common driving amplifiers 46 when any several points have the same bearing angle.

A fourth gate, the sense gate 255, forms sense pulses that indicate direct ($\theta=\theta'$) or reverse ($\theta=\theta'+180°$) comparison. When $\theta=\theta'$ angle comparator 85 transmits a pulse to sense multivibrator 254. Sense multivibrator 254 is a bistable device. The pulse from angle comparator 85 puts it into state number one. The output of sense multivibrator 254 when in state one is $V_1$ and is applied to one input of sense gate 255. When sense gate 255 is conditioned along with gates 88, 89, and 90 it converts voltage $V_1$ into a pulse signal, whose amplitude $v_1$ is proportional to $V_1$. When $\theta'=\theta+180°$ reverse angle comparator 85a transmits a pulse to sense multivibrator 254 putting it into state two. Its output in state two is $V_2$ which is one half $V_1$. The voltage $V_2$ feeds into sense gate 255. When the gates 88, 89, 90 and 255 are conditioned again, sense gate 255 converts voltage $V_2$ into a pulse signal whose amplitude is $v_2$ where $v_2$ is one half $v_1$. The pulse signals formed by sense gate 255 are synchronous with pulse signals $R_B$, $H_B$, $I_B$. When the output of gate 255 is equal to $v_1$ it indicates $\theta'=\theta$, but when the amplitude is $v_2$ it indicates $\theta'=\theta+180°$. The pulse signals from all sense gates 255 to 255n feed into sense detect 252 in channel 240 of computer 199. The sense pulses as well as the pulse signals are all negative as shall be explained.

The effect of any point channel 100 to 100n is to sample three of the sustained data signals synchronously with the movement of the display screen 56. It uses the remaining two sustained data signals (the angle signals) to effect proper synchronism. If the target point changes so as to change its bearing angle, the corresponding image spot also changes its angle. If this change is fairly large, e.g. 10 or 20 degrees and occurs within the period of a single rotation of the screen, the image spot will not be continuously available to view. There are two solutions to this problem, the rate of rotation of the screen may be increased so that no large change of position occurs within a single cycle, or the data displayed may be limited to slower changes. Slow changes of position imply slow changes of data signals and hence small bandwidths. These will be D.C. to low audio signals. This, of course, applies to the other signals, $R_A$, $H_A$, and $I_A$. The identity signal, $I_A$, might also be narrow band, but rapid variation in intensity may be used as an identification code and require somewhat larger bandwidths.

The identification matching circuit 82 is adjusted so that the voltages at the output ultimately determine the brightness of the spot of light on the face of the cathode ray tube 51 by modulating a control grid 241 of the cathode ray tube 51. The sine $\theta$ and cosine $\theta$ matching circuits 83 and 84 are adjusted so that the maximum voltages at their outputs are made equal to the maximum voltages from the screen angle indicating sine potentiometer 60 and cosine potentiometer 61 respectively. The maximum output voltages of matching circuits 83 and 84 shall hereinafter be designated as voltages $E_1$ and $E_3$ respectively, and the maximum voltages from potentiometers 60 and 61 shall be designated as voltages $E_2$ and $E_4$ respectively. Thus, the voltages are adjusted so that $E_1=E_2$ and $E_3=E_4$. As previously mentioned, sine and cosine potentiometers 60 and 61 produce voltages which are the sine and cosine of the bearing angle of the screen 56. It will be appreciated that each potentiometer may be provided with two wiping arms so that two voltages are produced, wherein one voltage is proportional to the given function of the screen 56 bearing angle, and the other voltage is proportional to minus the given function of that angle.

Accordingly, the outputs from elements 60, 61, 83, and 84 shall be referred to as indicated in the following chart:

| Element: | Output voltage |
| --- | --- |
| Matching circuit 83 | $E_1 \sin \theta$ |
| Matching circuit 84 | $E_3 \cos \theta$ |
| Sine potentiometer 60 | $E_2 \sin \theta'$; $-E_2 \sin \theta'$ |
| Cosine potentiometer 61 | $E_4 \cos \theta'$; $-E_4 \cos \theta'$ | where $\theta$=bearing of the target and $\theta'$=angle of the screen 56.

Four voltages $E_1 \sin \theta$; $E_2 \sin \theta'$; $E_3 \cos \theta$; and $E_4 \cos \theta'$, the wave forms of which are shown in Figs. 5A and 5B, are fed into angle comparator 85.

Figure 6A illustrates the angle comparator 85 and it operates so as to yield an output pulse when the bearing angle of the target and the angular position of the screen are equal, i.e., when $E_1 \sin \theta=E_2 \sin \theta'$ and $E_3 \cos \theta=E_4 \cos \theta'$ indicating that $\theta=\theta'$. The cathode follower buffers 85b and 85c (Fig. 6A) receive the voltages $E_1 \sin \theta$ and $E_2 \sin \theta'$ respectively and feed them into sine wave comparator 85f. The buffers 85b and 85c show the same constant output impence to the sine wave comparator 85f and serve to prevent comparator 85f loading from disturbing the input signals that also go to other circuits. The sine wave comparator 85f is a form of the "comparators to produce a marker when a sinusoid equals a fixed voltage" (reference—Waveforms by Chance et al., p 348 et seq., first ed. 1949). The "sinusoid" is $E_2 \sin \theta'$ (Fig. 5A) that varies at about 25 cycles per second, and $E_1 \sin \theta$ (Fig. 5A) is taken as the fixed voltage. This voltage $E_1 \sin \theta$ is of course not fixed in the absolute sense. It may have all values between $+E_1$ and $-E_1$, and it may vary with time, but its time rate of change as previously described is very slow compared to $E_2 \sin \theta'$. Therefore, it may be taken as a reference or "fixed" voltage. These two voltages, $E_1 \sin \theta$ and $E_2 \sin \theta'$, have the some value twice per cycle, e.g., at points $a$ and $a_1$ and again $a_2$, $a_3$ (see Fig. 5A). The sine wave comparator 85f (Fig. 6A) produces a positive marker pulse whenever these two voltages are equal. Fig. 5C shows such markers at $C_0$, $C_1$, $C_2$, $C_3$. These marker pulses are impressed upon the first control grid 85h of a dual grid control tube 85j, such as the 6AS6, which serves as a coincidence detector.

The cathode follower buffers 85d and 85e (Fig. 6A) function for the voltages $E_3 \cos \theta$ and $E_4 \cos \theta'$ in the same manner as buffers 85b and 85c do. The sine wave comparator 85g also functions in the same way as its analog comparator 85f. Thus, when its two voltage inputs are equal, as shown in Fig. 3B at $b_1$ and $b_2$, and again $b_3$ and $b_4$, this comparator 85g also produces positive marker pulses. These are shown at $d_1$, $d_2$, $d_3$, and $d_4$ in Fig. 5D and are impressed upon the second control grid $85i$ of the coincidence detector, $85j$.

When and only when marker pulses from both comparators $85f$ and $85g$ are simultaneously impressed upon both control grids $85h$ and $85i$ does the coincidence detector $85j$ conduct and a pulse formed at its output. The detector output pulses $e_1$ and $e_3$ shown in Fig. 5E indicate coincidence of pulses $c_1$ and $d_1$ along with $c_3$ and $d_3$ respectively. When pulse $c_1$ is produced $E_1 \sin \theta = E_2 \sin \theta'$, and when pulse $d_1$ is produced $E_3 \cos \theta = E_4 \cos \theta'$. Accordingly, the pulse $e$ indicates that the aforementioned two voltages are equal and $\theta = \theta'$. This holds as $E_1 = E_2$ and $E_3 = E_4$ by the adjustment of the sine and cosine matching circuits 83 and 84 respectively as previously described.

The reverse angle comparator $85a$ (Fig. 3) has the same physical structure as angle comparator 85, but operates so as to yield an output pulse when the bearing angle of the target is equal to the reverse angle of the screen, i.e., $\theta = \theta' - 180°$. This holds when $E_1 \sin \theta = -E_2 \sin \theta'$ and $E_3 \cos \theta = -E_4 \cos \theta'$. The voltages $E_1 \sin \theta$ and $-E_2 \sin \theta'$ the waveforms of which are shown in Fig. 5F are compared within reverse angle comparator $85a$ to produce marker pulses when they are equal. These marker pulses are also produced as pairs per cycle at $f_1$ and $f_2$, and again at $f_3$ and $f_4$ (see Fig. 5F). The voltages $E_3 \cos \theta$ and $-E_4 \cos \theta'$ the waveforms of which are shown in Fig. 5G are also compared within unit $85a$ to produce marker pulses when they are equal. These voltages $E_3 \cos \theta$ and $-E_4 \cos \theta'$ are equal at $g_1, g_2, g_3,$ and $g_4$. There is coincidence at $f_2, g_2$, and at $f_4, g_4$ to produce coincidence pulses at $h_2$ and $h_4$ respectively as shown in Fig. 5H. The coincidence output pulses $h_2, h_4$ occur only when $\theta' = \theta - 180°$, and are the output pulses of reverse angle comparator $85a$.

Angle comparator 85 and reverse angle comparator $85a$ (Fig. 3) are both connected at their outputs through isolating buffer $86a$ to an input of hold multivibrator 86 which is a bistable circuit. An output signal from either angle comparator 85 or $85a$ causes the hold multivibrator 86 to change its state from state one to state two. The other input of hold multivibrator 86 is connected to the output of coincidence separator 95 (to be later described in connection with Fig. 6C). Hold multivibrator 86 is caused to change back to its first state by a pulse from separator 95 within such a short period after having received its first pulse from either comparators 85 or $85a$ that angular definition is not substantially reduced by the movement of screen 56 within that short period, as shall be shown. The output of hold multivibrator 86 is connected to the input of metering pulse generator 87 which is a monostable multivibrator, so that when hold multivibrator 86 reverts back to its first state, it triggers metering pulse generator 87, which in turn produces a metering pulse of fixed amplitude and fixed duration. The output of pulse generator 87 is connected to a second input of the gates 88, 89, 90 and 255, and consequently each of these aforementioned gates are alerted for a period equal to the duration of the metering pulse. The first inputs to the gates 90, 89, and 88 are, as previously mentioned, connected to the output of radius matching circuit 80, height matching circuit 81, and identification matching circuit 82 respectively; and therefore, when radius gate 90, intensity gate 88, and height gate 89, each receive an activating pulse from metering pulse generator 87, they produce pulse data signals, the amplitudes of which are proportional to the sustained voltages at their first inputs.

Reference is now made to Fig. 6B in conjunction with Fig. 3 illustrating in more detail the height gate 89, which may be considered typical of the gates 88, 89, 90, and 255. Fundamentally, the height gate includes a dual control electrode tube $89f$, such as the 6AS6. The first control grid $89b$ receives a sustained data signal, here the adjusted height signal from the height matching circuit 81. The second control grid $89e$ is so biased, that the plate current is cut off. When and only a positive metering pulse is applied to the second control grid $89e$ from pulse generator 87 does current pass through to the anode $89d$. The first control grid $89b$ is so biased that the tube $89f$ may conduct over the entire range of voltages it receives from height matching circuit 81. Since, the amplitude of the positive metering pulse applied to the second control grid $89e$ is constant, the output pulse amplitude is made proportional to the sustained adjusted input signal. The output signal pulse taken at the anode $89d$ is always negative permitting the isolating diode $89c$ connected thereto to act as a switch. When a negative signal pulse is generated at anode $89d$, diode $89c$ acts as a short and the pulse passes to the common input of height preamplifier 248 in channel 240 of computer 199.

When, however, no signal pulse is generated and tube $89b$ is quiescent, diode $89c$ acts as an open circuit. Consequently, the driving impedance of tube $89b$ is prevented from loading down any height output pulse signals from other height gates up to and including $89n$ (Fig. 3), since all the height gates are in parallel.

Referring again to Fig. 3, identity gate 88 is connected at its output through delay element 246 and intensifier driving amplifier 253 to the control electrode 241 of cathode ray tube 51. Thus, the signal from gate 88 determines the brightness of the spot produced on the screen $51d$ of cathode ray tube 51 and consequently on viewing screen 56. Height gate 89 is connected via height preamplifier 248 and channel 240 of computer 199 to the deflection elements of one electron gun of cathode ray tube 51, and hence the signal formed by gate 89 in part determines the position of a spot of light on viewing screen 56. Radius gate 90 is connected via radius preamplifier 244 in channel 240 of computer 199 to the deflection elements of the same electron gun of cathode ray tube 51 and the signal formed by gate 90 also in part determines the position of the spot of light on viewing screen 56. Sense gate 255 is connected to sense detect 252 of channel 240 of computer 199 to indicate direct ($\theta' = \theta$) or reverse ($\theta' = \theta + 180°$) comparison. Thus, when $\theta = \theta'$ and again when $\theta = \theta' - 180°$, the angle comparators 85 and $85a$ respectively trigger the display of a spot image by causing the metering pulser 87 to activate the radius gate 90, height gate 89, identity gate 88, and sense gate 255.

As previously stated the coincidence separator 95 sweeps the point channels 100 to $100n$ in conjunction with the hold multivibrators 86 to $86n$ and metering pulser 87 to $87n$. This action prevents pulse signals from the several point channels 100 to $100n$ from interfering with each other at the common driving amplifiers 46 when any several points have the same bearing angle. It was also stated that hold multivibrator 86 is caused to change back to its first state by a pulse from coincidence separator 95 within such a short period after having received its first pulse from either angle comparator 85 or $85a$ that angular definition of the display is not effectively reduced by the movement of screen 56 within that period. The sweeping action of separator 95 consists in repeatedly sending a pulse to each of the hold multivibrators 86 to $86n$ in temporal sequence; the repetition period of the pulse received by each hold multivibrator 86 from separator 95 is of short duration as compared with the time it takes the screen 56 to sweep an angle corresponding to $\Delta\theta'$, the angular definition.

It can be stated that $\theta' = 2\pi ft$, where $f$ equals the frequency of the rotation of screen 56 and $\Delta\theta' =$ the angular definition where $\Delta\theta' = 2\pi fq$, and $q =$ the period corresponding to the angular definition, i.e., the definition interval. Therefore, if $f = 25$ c.p.s. and $\Delta\theta' = 1$ degree; $q = \frac{1}{25} \times \frac{1}{360} = 111$ microseconds. If there were $n$ point channels whose points could all possibly have the same bearing angle, the signal pulses from the gate circuits 88, 89, and 90 not to interfere with each other have a duration equal or less than $q/n$. If $n=10$, then $q/n=11.1$ microseconds. Or if $n=100$, then $q/n=1.11$ microseconds. The repetition period of the pulses received by each hold multivibrator 86 from coincidence separator 95 has thus been established as equal to or less than $q$.

Referring now to Fig. 6C in conjunction with Fig. 3, it may be seen that coincidence separator 95 comprises a frequency reference which includes a stable oscillator 131 whose frequency is $n/q$. Oscillator 131 transmits its signals to spike generator 132. Spike generator 132 consists of a circuit such as a multiar, that converts its sinusoidal input into a sharp pulse output at a fixed phase of the input. A representation of these spike signals is shown in Fig. 5I. The spike period is of course $q/n$. The spike signal is fed into ring counter 133 that comprises a ring of bistable elements 134 to 134$n$. All the bistable elements 134 to 134$n$ receive the spike signals and all the bistable elements, except one, are in the same state, here called passive or non-conducting. This one exception is in the other state, here called active or conducting. Any element, for example, 134$j$, changes its state from passive to active only when it receives both a spike signal and a permissor signal from an immediately preceding active element, e.g. 134 $(j-l)$. This action causes the preceding active element 134 $(j-l)$ also to change its state to passive. Thus, only one element is changed to an active state in cyclic sequence each time a spike pulse is received from spike generator 132. Each of these bistable elements 134 to 134$n$ generates a pulse when it is switched to its active state, which is transmitted to corresponding hold multivibrators 87 to 87$n$ respectively to which elements 134 to 134$n$ are connected. Thus spike numbered 0 triggers element 134, and element 134 in turn sends a pulse to hold multivibrator 87. Then, spike numbered 1 triggers element 134$a$, and element 134 in turn sends a pulse to hold multivibrator in point channel 100$a$ (not shown). This proceeds until spike numbered $n$ triggers element 134$n$ whereupon hold multivibrator 87$n$ is sent a pulse. The next pulse is number 0 again and the cycle repeats continuously.

The signal pulses formed by the gates 88, 89, 90 and 255 (Fig. 3) have a duration equal to that of the metering pulse received from metering pulse generator 87. To prevent interference, the metering pulse duration is made equal to L such that L is equal to or less than $q/n$. This pulse L is shown in Fig. 5J. Thus, signal pulses from the gates 88, 89, 90, and 255 also have a duration L, and this is also approximately the period for which electrons in cathode ray tube 51 illuminate the phosphor screen 51$d$ on the face of the tube 51. The period for which light is emitted by cathode ray tube 51 is equal to $L+D$; where D is the decay time of the phosphor (see Fig. 5K). A fast phosphor is used whose decay time D is equal or less than the definition interval minus the electron illumination period $(D=q-L)$.

To avoid jitter of the spot within the definition interval $q$ and thus within the angular definition $\Delta \theta'$, the frequency reference 131 (Fig. 6C) may be synchronized by a sine signal e.g. $E_2 \sin \theta'$ from sine potentiometer 60 (Fig. 3).

While the coincidence separator 95 operates on all point channels 100 to 100$n$ in the system of Fig. 3, this is not the only mode of operation possible. Where the data precludes the possibility of some groups of points having the same bearing angle, the coincidence separator 95 may sweep such groups of point channels in parallel.

The previously described computations corresponding to reversion (changing $(x_\theta, y_\theta)$ to $(-x_\theta, y_\theta)$ when $\theta'=\theta+180°$) and computations corresponding to rotation (i.e. $x_0=x_\theta \cos \theta' - y \sin \theta'$ and $y_0=y_\theta \cos \theta' + x_\theta \sin \theta'$) are made by each channel 240 and 240' of rotation computer 199 shown in Fig. 3 to which reference is again made. The description of channel 240 given below applies with some slight changes also to channel 240'.

When the bearing angle of a point, P, to be displayed is equal to the angle of screen 56 (when $\theta=\theta'$), the gates 88, 89, 90 and 255 operate and convert their input voltages to pulse signals for identity, height, radius, and sense respectively. The radius pulse signal $R_B$ from gate 90 is fed into radius preamplifier 244; the height pulse signal $H_B$ from gate 89 is fed into height preamplifier 248; and the sense pulse signal, $v_1$, is fed from gate 255 to sense detect 252. The identity pulse signal $I_B$ from gate 88 bypasses the computer 199 and is fed into identity driving amplifier 252. To improve the coincidence of identity pulses $I_B$ with computed radius and height pulses fed into driving amplifiers 46, delay line 246 having a short delay period (a fraction of a microsecond) may be introduced before the identity driving amplifier 252.

The sense detect 252 has three outputs, A connected to direct gate 249, B connected to reverse gate 250, and C connected to both radius preamplifier 244 and height preamplifier 248. As previously described all sense gates 255 to 255$n$ feed negative sense pulses into sense detect 252. When the amplitude of a pulse from any of the gates 255 to 255$n$ is $v_1$, it indicates $\theta'=\theta$ and when the amplitude of a pulse is $v_2$, it indicates $\theta'=\theta+180°$. Also $v_1=2v_2$. Refer now to Fig. 4 which illustrates the operation of sense detect 252. The sense detect 252 comprises a diode 256 connected at its cathode to the output of gate 255 in all the point channels 100 to 100$n$. The anode of diode 256 is connected through a resistance network to a potential of $+V_2$ volts. Additionally, the anode of diode 256 is connected to the input of amplifier 257, having a gain of $G_0$. The output of amplifier 257 is connected to terminal A (i.e. the input of gate 249) and to one input of summing amplifier 259 via amplifier 258. The outputs of gates 255 are also connected to the input of amplifier 260 which also has a gain of $G_0$. Amplifier 260 is in turn connected at its output to the second input of summing amplifier 259. The output of amplifier 259 is designated as output B and is connected to the input of reverse gate 250. The amplifier 260 is also coupled to output C and thence to preamplifiers 244 and 248 via cathode follower 261. Output C is clamped via diode 262 and a voltage divider to an upper potential of $+V_c$ volts.

When the pulse received by sense detect 252 is $v_1$ it passes through diode 256 whose anode is set at a fixed potential, $v_2$, where $v_1=2v_2$. Thus, only that portion of the pulse more negative than $|v_2|$ passes through diode 256. The amplitude of the transmitted pulse is $v_1-v_2$. Since, as previously explained, $v_1=2v_2$ then $v_1-v_2=v_2$. This reduced pulse, $v_2$, is amplified by gain $G_0$ of amplifier 257 to a positive amplitude of $G_0v_2$ and passes out through terminal A of the sense detect 252 to direct gate 249 where it operates as a positive permissor pulse. The output $G_0v_2$ of amplifier 257 is amplified again by amplifier 258 to a negative pulse of twice the input amplitude, or $G_0v_1$ and then impressed on one input of summing amplifier 259. Meanwhile, the original input pulse $v_1$ applied to the cathode of diode 256 has passed through amplifier 260, whose gain is also $G_0$ where it is made a positive voltage $G_0v_1$, and then impressed on the other input of summing amplifier 259. Since the inputs are equal and opposite in polarity, they cancel and the output of summing amplifier 259 is zero. The output of amplifier 259 is connected through terminal B to reverse gate 250, and the quiescent output of amplifier 259 is negative, and acts as an inhibitor on reverse gate 250.

When the pulse received by sense detect 252 has an amplitude $v_2$, it cannot pass through diode 256 so the output of amplifier 257 remains quiescent. The quiescent negative voltage output of amplifier 257 acts as an inhibitor on direct gate 249 through terminal A. However, the original negative pulse $v_2$ is amplified by gain $G_0$ of amplifier 260 to a positive voltage $G_0v_2$. This amplified pulse then passes through the summing amplifier 259 unchanged in either amplitude or polarity since the other input to summing amplifier 259 from amplifier 258 is zero. This positive pulse $G_0v_2$ is then impressed through terminal B on reverse gate 250 where it acts as a permissor pulse. When no sense signals are impressed on sense detect 252, both output terminal A and B are negative and inhibit both gates 249 and 250.

In both cases when $\theta'=\theta$ as well as when $\theta'=\theta+180°$ the positive output pulses from amplifier 260 which are $G_0v_1$ and $G_0v_2$ respectively are passed through a cathode follower 261 which functions as an isolator. The pulses leaving cathode follower 261 are limited by diode 262 to an amplitude of $v_c$ which is less than $G_0v_2$. These limited pulses, or level pulses, leave the sense detect 252 at terminal C and are transmitted to preamplifier 244 and height preamplifier 248.

The radius and height preamplifiers 244 and 248 (see Fig. 3) convert the negative monopolar radius and height pulse signals, $R_B$, $H_B$, they receive from any radius gate 90 or height gate 89 respectively, into bipolar pulses, $R_C$, $H_C$. The radius preamplifier 244 transmits its bipolar radius pulses $R_C$ to both direct gate 249 and reverse gate 250. The height preamplifier 248 transmits its bipolar height pulses $H_C$ to height amplifier 229. The conversion to bipolar pulses is needed to make computer 199 operable for all four quadrants of cathode ray tube 51 (see Fig. 2) i.e. so the electrical equivalents of positive and negative values of radius and height ($x$ and $y$) are developed.

Refer to Fig. 7 showing a block diagram of the height preamplifier 248, and to Fig. 8 which shows a graph of the wave forms within height preamplifier 248 under different conditions. The height preamplifier 248 comprises a pair of cathode followers 263 and 264 which are connected at their outputs to the first and second inputs of a summing amplifier 265 having a gain of $G_1$. The output of summing amplifier 265 and consequently the output of height preamplifier 248 is connected to the input of height amplifier 229 (Fig. 3). Cathode followers 263 and 264 are connected at their inputs to the outputs of gates 89 in point channels 100 to $100n$ and to the output of sense detect 252, respectively.

A negative height signal pulse of amplitude $v_H$ (Fig. 8B) from height gate 89 is fed into cathode follower 263. The positive sense pulse of amplitude $v_c$ from terminal C of sense detect 252 is fed into cathode follower 264. The two pulses add algebraically at the input of summing amplifier 265. Fig. 8A shows the sense pulse $v_c$ with a time base; Fig. 8B shows signal height pulses with the same time base for three different conditions, cases I, II, and III; Fig. 8C shows the algebraic sum pulses, $v_H-v_c$, at the input of summing amplifier 265 for three cases; and Fig. 8D shows the inverted output of summing amplifier 265 $(v_H-v_c)G_1$ for the same three cases. The voltage, $v_c$, corresponds to a height of zero on cathode ray tube 51 (Fig. 1 or 3). In case I, a positive height is represented by a large negative pulse height signal, $v_H$ (Fig. 8B–I). This pulse when added to a positive $v_c$ pulse produces a negative $(v_H-v_c)$ output (Fig. 8C–I). The output of summing amplifier 265 is a positive $(v_H-v_c)G_1$ pulse. A negative height on cathode ray tube 51 is represented by a small negative value of $v_H$ i.e. $|v_H|<|v_c|$ in case II, Fig. 8B–II. The small negative voltage $v_H$ added to $v_c$ produces a positive $(v_c-v_H)$ pulse shown at Fig. 8C–II and a negative $(v_c-v_H)G_1$ at the output of summing amplifier 265 shown at Fig. 8D–II. A height of level zero (on the axis of cathode ray tube 51) is represented by a value of $v_H$ such that $|v_H|=|v_c|$ shown in Fig. 8B–III. When this condition occurs a zero level is produced at both the input and output of summing amplifier 265 shown respectively at Fig. 8C–III and Fig. 8D–III. Thus, a positive or negative height electrical pulse signal $H_C$ is fed from height preamplifier 245 such that its value corresponds in magnitude and polarity to the value of the height ($y$) of the point, P, being represented on cathode ray tube 51 and consequently on the screen 56.

The radius preamplifier 244 (Fig. 3) is similar to the height preamplifier 248 and converts the negative radius pulse signals, $R_B$, into bipolar radius pulses $R_C$ that correspond to the radius positional polarity and magnitude ($x$) of the point, P, being represented on cathode ray tube 51. The bipolar output radius pulse is fed into both the direct gate 249 and the reverse gate 250. When $\theta'=\theta$ the direct gate 249 acts as a permissor and the reverse gate 250 acts as an inhibitor on control voltages from sense detect 252 as previously described. Thus, the bipolar pulse, $R_C$, passes through gate 249 and is applied to radius amplifier 222 when $\theta=\theta'$. When $\theta=\theta'+180°$, the direct gate 249 acts as an inhibitor and reverse gate 250 acts as a permissor again by control voltages from sense detect 252. The bipolar pulse, $R_C$, now passes through reverse gate 250 into inverting amplifier 251 where it is inverted to a $-R_C$ pulse and applied to radius amplifier 222. Thus, when $\theta'=\theta+180°$, $R_C$ is inverted but $H_C$ is not, so the electrical equivalent of reversion is affected.

When reverse gate 250 is inhibited and direct gate 249 is open (i.e. only when $\theta=\theta'$) then the radius amplifier 222 and height amplifier 229 amplify bipolar pulse signals $R_C$ and $H_C$. The radius signal R from amplifier 222 is passed into inverting amplifier 225 where it is inverted to a $-R$ pulse. The height signal H is passed into inverting amplifier 232 where it is inverted to a $-H$ pulse.

The amplified radius signal R, which is a function of voltage $R_A$ is also applied to the upper terminals of sin $\theta'$ potentiometer 223 and cos $\theta'$ potentiometer 224, as well as inverting amplifier 225. The inverted radius signal, $-R$, from amplifier 225 is fed into the lower terminals of sin $\theta'$ potentiometer 223 and cos $\theta'$ potentiometer 224. The dotted line 226 indicates a mechanical linkage that drives the wiper arms of potentiometers 223 and 224, as well as 230, 231, 223', 224', 230' and 231' in unison with the screen movement 56.

Refer now to Figures 9A and 9B which show respectively a physical and schematic representation of potentiometer 223. The electrical signals R and $-R$ from amplifiers 222 and 225 are applied respectively to the upper terminal $227u$ and the lower terminal $227l$ of sine $\theta'$ potentiometer 223. A wiper arm 228 is rotated by a mechanical linkage 226 connected to motor 242 (Fig. 10A) that turns the wiper arm 228 in unison with rear projection screen 56. The angle of wiper arm 228 at any instant, is equal to the bearing angle of rear projection screen 56, and the voltage output of the wiper arm 228 is $\pm R \sin \theta'$. Therefore, there is an effective multiplication of the radius signal R and sin $\theta'$. The cos $\theta'$ potentiometer 224 operates in a similar manner except that its wiping arm is displaced 90 degrees ahead, and its output is $\pm R \cos \theta'$.

Referring back to Fig. 3, it will be appreciated that in a similar way a height signal, $H_c$, which is a function of voltage $H_A$, is fed into height amplifier 229. The amplified signal, H, from element 229 is conducted to the lower terminals of sin $\theta'$ potentiometer 230, the upper terminal of cos $\theta'$ potentiometer 231, and an inverting amplifier 232. The inverted height signal, $-H$, from amplifier 232 is applied to the upper terminal of sin $\theta'$ potentiometer 230 and the lower terminal of cos $\theta'$ potentiometer 231. These potentiometers 230 and 231 function in the same way as potentiometer 223, but since the inputs of potentiometer 230 have been inverted (as compared with the inputs of potentiometer 223) its outputs are respectively $-H \sin \theta'$ and $+H \cos \theta'$. The outputs of potentiometer 224 and 230, $R \cos \theta'$ and $-H \sin \theta'$, are fed into radius summing amplifier 233. The two signals are added algebraically and amplified here. The output of summing amplifier 233 is $R \cos \theta' - H \sin \theta'$ and is equal to $R_\theta$ where $R_\theta$ corresponds to $x_\theta$, R to $x_0$, H to $y_\theta$ in the expression $x_\theta = x_0 \cos \theta' - y_0 \sin \theta'$ previously set forth. The outputs of potentiometers 223 and 231, $R \sin \theta'$ and $H \cos \theta'$ respectively are fed into height summing amplifier 237. There they are added and amplified and the output, $H \cos \theta' + R \sin \theta'$ is equal to $H_0$ where $H_0$ corresponds to $y_0$ in the expression $y_0 = y_\theta \cos \theta' + x_\theta \sin \theta'$ The outputs of the summing amplifiers 233 and 237 produce respectively the electrical signals $R_0$ and $H_0$ when the inputs to channel 240 of computer 199 are the electrical signals $R_B$ and $H_B$ and the mechanical linkage 226 is at $\theta' = \theta$.

The summing amplifiers 233 and 237 and all other summing amplifiers of this embodiment are of the same basic form. These summing amplifiers (e.g. 233) have two inputs, equivalent circuits of which are shown in Fig. 11. Input one to the summing amplifiers is represented by $E_1$, $R_1$, and input two is represented by $E_2$, $R_2$, where $E_1$, $E_2$, and $R_1$, $R_2$, are open circuit output voltages and output impedances respectively. The impedances $R_1$ and $R_2$ are made equal and the voltage across $R_3$, the summing amplifier input impedance is therefore equal to $k(E_1+E_2)$ by super position. Here $k$ is a factor less than unity. Thus, the summing amplifier connected to $R_3$ (e.g. summing amplifier 237) has a single input voltage that is proportional to the sum of its original two input voltages. The requirement on the summing amplifier is that its gain be constant. The value of its gain and bandwidth depend upon design characteristics of the circuits with which it is employed and are well within the state of existing art. (The summing amplifiers of general purpose computers require very high gain and the concomitant low bandpass, for their operation.)

As previously explained, each image spot is produced twice for each cycle of rotation of screen 56, when $\theta' = \theta$, and again when $\theta' = \theta + 180°$. The operation of the computer 199 for $\theta' = \theta$ was described above. When $\theta' = \theta + 180°$ the radius signal $-R_C$ produced by amplifier 251 (Fig. 3) is impressed on radius amplifier 222 since reverse gate 250 is now activated and the inverted signal is utilized. The height amplifier 229 receives the signal $H_C$ again. The signals $-R_C$ and $H_C$ correspond to the coordinates $(-x_\theta, y_\theta)$, and produce a reverted image of $(x_\theta, y_\theta)$ (see Fig. 2B). This reversion is required to place the second image in the same position in the display chamber 70 as the first. The outputs of all the potentiometers 223, 224, 230 and 231 now correspond to $\theta+180°$; so that now $R_0 = -R \cos (\theta+180) -H \sin (\theta+180)$ and $H_0 = H \cos (\theta+180) -R \sin (\theta+180)$. (See Fig. 2B.) $R_0$ now corresponds to $x_0'$ and $H_0$ corresponds to $y_0'$, $-R$ to $-x_\theta$ and $H$ to $y_\theta$; so that reversion and rotation are both affected.

Channel 240' of rotation computer 199 is similar in function to that of channel 240 except of course that it receives different electrical input signals and its output drives another electron gun 236' (Fig. 1) of the cathode ray tube 51 within generescope 50. The potentiometers 223', 224', 230', and 231' of channel 240' are driven by the same mechanical linkage 226. However, the gates 249' and 250' therein receive intelligence signals that originate in moving film signal source 149.

There are three inputs into a given channel (e.g. 240) of computer 199. They are radius and height electrical signals, $R_B$ and $H_B$ and the electrical signal indicative of the angle $\theta'$ of screen 56. The electrical signal inputs indicative of the angle $\theta'$ to each channel of the computer 199 will now be described in connection with their origin. The bearing angle $\theta'$ of screen 56 is introduced through the mechanical linkage 226 and its ultimate control originates in generescope 50. There a servo generator 137 is mechanically driven, as previously described, in synchronism with the screen 56. Generator 137 in turn drives servo motor 242 through one of the outputs of servo amplifier 243 so that the angular rotation of screen 56 is reproduced in the mechanical linkage 226. This linkage 226 is common for all the driven potentiometers 223, etc. of rotation computer 199.

Refer now to Figs. 10A and 10B which show in more detail the linkage between servo motor 242 and elements 223, 224, 230 and 231. The servo motor 242, the sine and cosine potentiometers 223, 224, 230, 231, and mechanical linkage elements 226a to 226d are all mounted on a common support plate 247. The servo motor 242 drives a shaft 226a on which is rigidly mounted a gear 226b. This gear 226b engages gears 226c and 226d and through their shafts 226e and 226f drive the sine and cosine potentiometers 223, 224, and 230, 231 respectively. The shaft 226a and the base plate 247 are shown broken off at the left in Figs. 10A and 10B indicating that they extend further and respectively drive and support other groups of potentiometers. These other potentiometers are not shown in Figs. 10A and 10B, but are represented in Fig. 3 by all other potentiometers 223', 224', 230', 231' as well as 60 and 61 that are driven by mechanical linkage 226. This mechanical linkage 226 comprises in part the mechanical elements 226a and 226f that transmit the motion from the servo motor 242 to the potentiometers.

While the rotation computer 199 uses analog techniques involving multiplication and summing, the limited nature of the operations and the conditions under which they are performed inherently permit large bandwidths for short pulses and high data rates. Multiplication is affected by the application of electrical signals to a potentiometer and the picking off of a portion of those signals by the mechanical motion of a wiper arm (see Figs. 9A and 9B). This action does not limit the rate at which the electrical output signals as well as the electrical input signals may change.

Refer again to the overall block diagram, Fig. 3. A moving film source 149, a slight modification of moving film signal source disclosed in copending application S.N. #708,474, generates signals for the display of three dimensional images of predetermined scenes. These signals are transmitted to source amplifiers 198 comprising radius, height, and intensity preamplifiers 266, 267, and 268 respectively. Source amplifiers 198 send radius and height signals to channel 240' of rotation computer 199. The radius and height signals are processed for effective rotation, by channel 240' of computer 149 and with an intensity signal from source amplifiers 198 are fed into channel 245' of the driving circuits 46 whence they are fed into a second electron gun 236' (see Fig. 1) in cathode ray tube 51 of generescope 50.

Referring now to Fig. 12, there is shown a film signal source 149 which is an apparatus similar to multichannel magnetic tape reproducers or multichannel sound film reproducers. It, however, produces several electrical signals from a record on a photographic film strip 150, which produce in generescope 50 (of Fig. 3) three dimensional scenes. The moving film signal source of this application is similar to that of copending application S.N. #708,474 except that it has only one composite transducer 158, and each field recorded on film 150 defines a diametrical section rather than a radial section.

The moving film signal source 149 may be operated in either of three ways. In the first way, the film 150 moves from the storage reel 153 over roller 149a, through the optical transducer 158, over a series of rollers 149b to 149i, over roller 149j, and finally to take up reel 154. In this case, a temporal sequence of three dimensional scenes will be produced in generescope 50 so that motion may be exhibited. In the second mode of operation, a continuous loop of film 150 moves from roller 149a to roller 149j as previously described, but continues over rollers 149k to 149p whence it returns to roller 149a to make the loop complete. In this second mode, a motionless three dimensional scene may be produced in generescope 50. In a third way, a continuous loop of film is again used to produce three dimensional images exhibiting cyclic motion as shall be described below.

The movement of film strip 150 (shown in detail in Fig. 13A) in any case is driven by all sprocket wheels 151, that engage film 150 for positive linkage at sprocket holes 150a. These sprockets wheels 151 are all linked mechanically to servo motor 152, which in turn in controlled by servo generator 221 through the second output of servo amplifier 243 (Fig. 3). Servo amplifier 243 is coupled to servo generator 137 which is on generescope 50 as previously described. Thus, film 150 is driven so that its motion is continuous, and synchronized with the motion of the screen 56, of generescope 50 (Fig. 3). The optical transducer 158 transforms the data recorded on film 150 into electrical signals that are carried ultimately to one electron gun of cathode ray tube 51. A detailed description of the operation of transducer 158 follows the description of the record on film 150.

Refer now to Fig. 13A. This broad view of film 150 shows that it is divided into three longitudinal tracks; radius track 155, height track 156, and intensity track 157. These three tracks 155, 156, and 157 store respectively, substantially, the range, height, and intensity data for the sections to be displayed. In radius track 155, a transverse distance across the clear portion of that track is a measure of the recorded value of the radius data for a section to be displayed. For height track 156, the transverse distance across the clear portion of that track is again a measure of the recorded value of the height data. However, in intensity track 157, only the transverse distance across the clear portion above cut off level 150b is a measure of the recorded value of the intensity data. Cut off level 150b corresponds to the cut off voltage level of the electron gun 236' of cathode ray tube 51 of the generescope 50 (see Fig. 3) so that the recorded value of intensity corresponds to the brightness of the display.

A single transverse line across the film 150, at $Z_1$, intersects the radius track 155 at 171, height track 156 at 172 and intensity track 157 at 173, to mark off respectively some given values of radius, height, and intensity, of a point to be displayed. The three values at 171, 172, and 173 determine the three coordinates ($r$, $h$, $i$) of a point P in a display section. That is, any three collinear transverse distances, as previously defined, across the three tracks refer to a common point in a radial display section. The length of film 150 from $Z_{00}$ to $Z_{11}$, hereinafter called a field, contains a record of a diametrical section of a scene 265 shown in Fig. 13B as it would appear on the face of cathode ray tube 51.

Refer again to Fig. 12 in conjunction with Figs. 12A and 12B. As previously stated, film 150 moves through optical transducer 158 in the moving film source 149 where the data recorded on the film 150 is transformed into electrical signals. In the cross sectional view of optical transducer 158A (Fig. 12A) it may be seen that light from lamp 161, a constant light source, by passing through lenses 162b and 163b, limited by stops 164 and 165, is brought to a focus at slit 160b in mask 159. It passes through film 150 behind mask 159 to lens 166b which focuses the transmitted light on the photomultiplier tube 167b.

The mask 159 with film 150 behind it is shown isolated in Fig. 12B. The three slits 160a, 160b, and 160c in mask 159 are long narrow apertures that lie astride radius track 155, height track 156, and intensity track 157 resepctively. The are collinear and traverse the film 150.

There are three single track transducers side by side that comprise optical transducers 158 shown in Fig. 12A. They are marked 143a, 143b, 143c, and transform the recorded data of radius, height, and intensity tracks 155, 156, and 157 respectively into electrical signals, $R'_A$, $H'_A$, $I'_A$, respectively. The path of light to be traced through height track transducer 143b in this view corresponds to the path of light described above in connection with the cross sectional view of optical transducer 158 in Fig. 12. The light from a common, constant, thin tubular light source 161 is brought to a focus by cylindrical lenses 162b and 163b at slit 160b and passes through film 150 at height track 156. The light leaving film 150 passes through cylindrical lens 166b which focuses it on photomultiplier tube 167b. The total luminous flux entering photomultiplier tube 167b is proportional to the clear portion of height track 156 behind slit 160b as is the electrical signal, $H'_A$, that the luminous flux generates. Light stops 164 and 165 are common to all three track transducers 143a to 143c and help define and limit the light beam. Partitions 158c, 158d, 158e, and 158f also prevent stray light paths and subsequent cross talk between channels.

The radius and intensity track transducers 143a and 143c operate in the same way. Since the slits 160a, 160b, 160c in mask 159 are collinear, and the clear portions of the three tracks on the same transverse line across film 150 give the values of the coordinates ($r$, $h$, $i$) of a point in a sectional view of the display, then the three electrical signals, $R'_A$, $H'_A$, $I'_A$, respectively generated at the same time also define the point.

It will be appreciated that each section 265 (Fig. 13B) requires a certain amount of time, $\tau$ (the display period increment) for its presentation. During this period, the rear projection screen 56 in generescope 50 rotates through an angle $\Delta\theta'$, the angular definition of the unified scene. The number of sectional views displayed in half a revolution of screen 56 is, of course, $180/\Delta\theta'$. In a half revolution of screen 56 the complete volume of the three dimensional image space of generescope 50 is swept out and consequently a complete three-dimensional image is formed which is comprised of diametrical sections. In the next half of revolution, the same three dimensional image is again swept out for all viewers of the display are to see the same thing. Thus, the $180/\Delta\theta'$ sectional views include all the sections displayed for a single solid image, and there must be at least $180/\Delta\theta'$ lengths of film $Z_{00}$ to $Z_{11}$ or fields which comprise a division. For the display of a single solid image this number of fields, $180/\Delta\theta'$ or a division may be sufficient. Loop operation of moving film signal source 149 as was previously described can be employed and the loop may have a division of only $180/\Delta\theta'$ fields; the first and last fields being connected. In the second half of revolution of screen 56 the loop is played over again for a second time. The same division is used twice for every cycle of screen 56.

For scenes depicting motion, film 150 is played through the transducer 158 only once, and the film strip then has a division of $180/\Delta\theta'$ fields for the display of a single solid image corresponding to half a revolution of screen 56. The film strip has another division of $180/\Delta\theta'$ fields of the sections in the same sequence for the second half of revolution of screen 56. The record then comprises a series of such double divisions or blocs to depict motion in three dimensional scenes.

The motion of film 150 in moving film signal source 149 (Fig. 3B) produces the radius, height, and intensity signals, $R'_A$, $H'_A$, and $I'_A$ respectively of sectional views of unified scenes. These $R'_A$, $H'_A$, and $I'_A$ signals are amplified in the radius preamplifier 266 (Fig. 3) and in the height preamplifier 267 where a D.C. level of zero volts is inserted midway between the signal extremes by well known methods. Thus, an output signal of zero volts refers to a positional (radius or height, or the equivalent $x$, $y$) value of zero (see Fig. 2) and a positive signal refers proportionally to a positive position, while a negative signal refers proportionally to a negative position. The bipolar balanced R, radius, and H, height, signals from radius preamplifier 266 and height preamplifier 267 are fed into radius amplifier 222' and height amplifier 229' of channel 240' of the rotation computer 199. In channel 240' the R and H signals are processed as previously described in connection with channel 240 of computer 199 and fed into the radius driving amplifier 234' and height driving amplifier 238'. An accompanying intensity signal I from the moving film signal source 149 meanwhile had been amplified in intensity preamplifier 268 and passed through delay 246' into intensity driving amplifier 253'. The signals from the three driving amplifiers 234', 238', and 253' are impressed on electron gun 236' in cathode ray tube 51 of generescope 50.

A fourth signal, a sense signal is generated in moving film signal source 149 by sine potentiometer 269 which is driven in synchronism with screen 56 by servo motor 152. The output of sine potentiometer 269 which has D.C. excitation (not shown) is $E_F \sin \theta$, where $E_F$ is an exciting voltage. This sense signal is amplified and clipped into a square wave by square wave generator 270 and applied to radius gate 249' in channel 240' of rotation computer 199. The output of square wave generator 270 is also applied to square wave inverter 271, an inverting amplifier, which applies the inverted square wave to radius gate 250'. The function of square wave generator 270 and inverter 271 corresponds in part to that of sense detect 252 of channel 240.

The wave forms of the sense signals, are shown in Fig. 14 in relation to the number of the fields (length of film containing a record of a section) about to enter the optical transducer 158 in moving film signal source 149. In Fig. 14(1) the $E_F \sin \theta'$ signal output of sine potentiometer 269 is shown; Fig. 14(2) shows the output of square wave generator 270, and Fig. 14(3) the output of square wave inverter 271 with the same abscissa of time (for screen 56 angle, $\theta'$) used in Fig. 14(1). Fig. 14(4), Fig. 14(5), and Fig. 14(6) show the number of the fields of film 150 entering transducer 158. When $\theta' = 0$ degrees the first field number A1 enters transducer 158, field number A2 follows, etc. and field number $$A \frac{180}{\Delta \theta'}$$

(the last field) leaves the transducer 158 when $\theta' = 180$ degrees. The fields A1 to $$A \frac{180}{\Delta \theta'}$$

comprise division A. In this time screen 56 has also rotated 180 degrees and a three dimensional scene has been swept out once. Fig. 14(4) illustrates loop operation of moving film signal source 149 that produces a fixed three dimensional scene, i.e. when $\theta' = 180°$ field A1 of one division enters transducer 158 again and is followed by field A2, etc. This action is repeated again at $\theta' = 360$ degrees and again every 180 degrees thereafter.

Over the angles 180 degrees to 360 degrees the radius signal input to the radius amplifier 222' (see Fig. 3) is inverted to compensate for the reversal of the optical projection system of generescope 50 by the reversed signals from the square wave generator 270 and square wave invertor 271 as shown in Fig. 14(2) and 14(3). These signals operate gates 249' and 250' to effect the action as previously described for gates 249 and 250.

Fig. 14(5) illustrates the operation whereby film 150 is fed through transducer 158 once, and produces motion in three dimensional scenes. When $\theta' = 0°$, field A1 enters transducer 158, field number A2 follows, etc., and field number $$A \frac{180}{\Delta \theta'}$$

leaves the transducer when $\theta' = 180°$. Another divison A' of fields A'1 to $$A' \frac{180}{\Delta \theta'}$$

pass through transducer 158 over the angular range 180 degrees to 360 degrees that is similar to division A. Divisions A and A' constitute bloc A. The reversed sense signals shown in Fig. 14(2) and 14(3) compensate again for the reversed optical projection by operating gates 249' and 250'. When $\theta' = 360°$ another bloc, B, of fields enter the transducer 158 and another three dimensional scene is produced. The action of the first cycle of division A for 0 degrees to 180 degrees and division A' for 180 degrees to 360 degrees is repeated for B, and so on.

Cyclic motion may be exhibited in three dimensions by using a loop of N blocs. Here N is the number of three dimensional scenes in the motion cycle. Fig. 14(6) illustrates that cyclic form of operation is similar to the previous forms, except that the last division N' and the first division A are continuous. The last three dimenisonal scene (N) is the immediate predecessor of the first three dimensional scene (A) in the cycle of motion being displayed.

In this invention discrete images can be displayed in three dimensions concurrently with three dimensional scenes. Since there are two independent electron guns 236 and 236' through which the information is exhibited, time sharing problems are obviated and the rate of data display is increased. By increasing the number of channels of computer 199 and the number of electron guns to three, four, five, or six, the rate of data display can be increased proportionally.

This invention demonstrates in its preferred embodiments, a general method for displaying three dimensional images by projecting two dimensional images from a fixed cathode ray tube onto a rotating screen sweeping out the volume of three dimensional images. A fixed set of coordinates axes on the face of the cathode ray tube when projected onto the display screen would rotate on the screen as the screen rotates, i.e., when the screen had rotated 90 degrees, the vertical and horizontal axes would become horizontal and vertical respectively, and when the screen had rotated 180 degrees, the horizontal and vertical axes would be inverted. An important feature of the invention is the means for effectively rotating the images formed on a fixed cathode ray tube with a fixed deflection system so that the images projected on the rotating system maintain their orientation with the screen.

The computer described takes signals from a repetitive signal source such as the point channels 100 to 100n and for the moving film signal source 149 that is synchronized with the screen rotation of the generescope. These signals are deflection signals that determine the position of the image referred to fixed axes on the rotating screen or what is equivalent to the projected rotating axes on the face of the fixed cathode ray tube. The computer processes these signals so they refer to fixed axes on the stationery cathode ray tube and determines the position of the image on the rotating screen. This computer process is referred to in this disclosure as electrical rotation of the image.

The second embodiment of this invention shown in Figs. 15 to 21 again applies the basic principle of exhibiting three dimensional images by sequentially displaying sectional images through rotation. As in my first embodiment, a generescope with a fixed cathode ray tube is used wherein the cathode ray tube has multiple electron guns. An image is formed on the face of the cathode ray tube which is also projected through a rotating passive optical system similar to that of the first embodiment. The image formed, however, is rotated in part by a magnetic deflection yoke that rotates with the optical system. This obviates the need of a computer such as that shown in Fig. 3. Also, a scan system is employed instead of deflection signals of the preceding embodiment. Individual beam alignment and rotation of quiescent position is provided to maintain the geometry of magnetic deflection scanning. A scanning data source with novel features supplies signals for the production of three dimensional images with this second form of generescope.

Referring now to Fig. 15, generescope 300 employs a multiple electron gun cathode ray tube 301 with rotating magnetic deflection yoke 302. Generescope 300 is similar in construction to generescope 50 of Fig. 1 of the first embodiment. All corresponding elements that are the same physical entities are given the same number used in the first embodiment of Fig. 1.

The phosphor screen 303 of cathode ray tube 301 is "illuminated" by electron beams, as shown by a central electron beam 304c. This beam originates in electron gun 305c of cathode ray tube 301 and is shown impinging on face 303 in its central quiescent position. A central ray of light 68 generated by electron beam 304c passes through an optical system comprising lens 52 and mirror 53, mirror 54, mirror 55, and rear projection screen 56. These passive optical elements are mounted in the same way as in the first embodiment. The cathode ray tube 301 is supported by an extended structure 306 that grips it over a considerable portion of its surface, and rests upon a fixed plate 204. The magnetic deflection yoke 302 is supported by collar 308 that is rigidly attached to cylinder 65 so that yoke 302 and collar 308 are rotated in unison with the optical projection system; i.e. with elements 52 to 56 which are also rigidly attached to cylinder 65. Slip ring assembly 309 conducts deflection signals to the rotating yoke 302.

There are five electron guns used in cathode ray tube 301 of which three guns 305b, 305c, 305d, may be seen in the section shown in Fig. 15. In Fig. 16A the five electron guns 305a to 305e are shown in a top view. An isolating grid (not shown) prevents voltages on any gun from affecting another. Each electron gun, e.g. 305a, has two pairs of electrostatic deflecting electrodes, radial ($x$ or horizontal) deflecting electrodes 311a and the height ($y$ or vertical) deflecting electrodes 312a. Corresponding deflection electrodes of the different guns are parallel, i.e. electrodes 312a are parallel to electrodes 312b, 312c, 312d, and 312e.

A description will now be given of the positions and displacements of the several electron beams 304a to 304e from guns 305a to 305e respectively. This will be followed by a description of the signals that give the required beam positions and displacements, and then the means for affecting those signals.

In Fig. 16A and B, the electron beams 304a to 304e are represented diagrammatically originating in their respective electron guns 305a to 305e and impinging on phosphor screen 303 of cathode ray tube 301 at $a$, $b$, $c$, $d$, $e$, respectively. These points $a$ to $e$ are collinear, on the axis, equidistant, and constitute the quiescent positions of the beams at a given phase in the rotation of screen 56 for a given scanned field. In Fig. 16C, a scanned field 313 is shown as the cross-hatched section of cathode ray tube face 303, and is composed of scanned sections 313a to 313e. The quiescent positions of the five beams are shown at points $a$ to $e$, each in the center of its scanned section. Each of the sections 313a to 313e are scanned by beams 305a to 305e respectively due to common horizontal and vertical magnetic deflection fields affected by deflection yoke 302 (see Fig. 15). These sections, 313a to 313e, are mutually exclusive and together occupy the whole scanned field 313.

The magnetic scanning of a single field 313 is completed in one display period, $\tau$. As an example, this display period, $\tau=111$ microseconds, if the angular definition, $\Delta\theta'=1$ degree, and the rate of screen 56 rotation is 25 cycles per second. In this display period, $\tau$, there is a single vertical magnetic sweep cycle but there are several horizontal magnetic sweep cycles. If there are ten horizontal sweep cycles, each sweep cycle (or sweep period, $s$) is 11.1 microseconds. There are, therefore, ten horizontal sweep cycles per scanned section and consequently fifty horizontal sweep cycles per scanned field. This scanning deflection method allows various modes of vertical definition that can be improved several ways. Angular definition may be reduced to improve vertical definition, i.e., if $\Delta\theta'=3$ degrees and each horizontal sweep period, $s$, remains 11.1 microseconds, the number of horizontal sweeps per scanned field 313 becomes 150. If the number of electron guns 305a, etc. were increased from five to ten, and $\Delta\theta'=3°$, the vertical definition would increase two fold, i.e., from 150 to 300 horizontal sweeps. Decreasing the screen 56 rotation rate from 25 to 20 cycles per second would also increase vertical definition by one-fourth, i.e., from 300 to 375 horizontal sweeps. The horizontal sweep period ($s=11.1$ microseconds) might be reduced and the number of sweeps increased proportionally. This would require a loss of horizontal definition or an increase in bandwidth for the intensity signals as well as encounter the difficulty of driving magnetic deflection coils at very high rates. The values cited in this disclosure of the relations obtaining for good definition are illustrative and demonstrate the advantage of multiple electron guns. The actual values used depend upon the application and may be chosen well within the state of existing electronic art.

In Fig. 16B the points $a$ to $e$ represent the quiescent positions of the beams at a given phase in the rotation of screen 56. In Fig. 16D corresponding points $a'$ to $e'$ represent the quiescent positions of the beams 304a to 304e respectively for a phase in the rotation of screen 56 that is 45 degrees advanced over that of Fig. 16B. This rotation of quiescent position is affected by the action of each of the two pairs of electrostatic deflection electrodes, i.e., 311a and 312a of electron gun 305a, of each of the electron guns. Fig. 16E shows that the scanned field 313' has also been rotated 45 degrees from that shown in Fig. 16C. The quiescent positions of the beams 304a to 304e at $a'$ to $e'$ are in the centers of their scanned sections 313a to 313e. The magnetic deflection yoke 302 (see Fig. 15) having rotated 45 degrees with the screen 56 is in position to sweep the scanned sections 313a' to 313e' through the action of its common horizontal and vertical magnetic fields as shown in Fig. 16E.

This action is continued in increments of time $\tau$, the display period corresponding to $\Delta\theta'$, the angular definition, as screen 56 rotates. The rotation of screen 56 is continuous, but so is the motion of the quiescent positions of the beams 304a to 304e on the phosphor screen 303, as is the motion of the magnetic yoke 302. Thus, a scanned field, such as 313 or 313' of Fig. 16C or 16E viewed directly on phosphor screen 303 are distorted by this continuous motion during the display interval, $\tau$. However, the motion of the optical projection system (elements 52 to 56) compensates and the scanned field 313' projected onto rear projection screen 56 is undistorted. Thus, even large display periods, $\tau$, corresponding to large values of angular definition ($\Delta\theta'=5$ or 10 degrees) do not distort the projection of scanned field 313 onto screen 56.

Refer to Fig. 16A and 16B. The voltages applied to the electro-static deflection plates 311a, etc., and 312a, etc. of each of the electron guns 305a to 305e have D.C. or aligning components that position the beams 304a to 304e with respect to the origin, $o$, of the coordinates on phosphor screen 303, and A.C. or rotating components that rotate the beam in its quiescent circular track 314a to 314e. The total instantaneous voltage applied to deflection plates 311a is $e_{ax}$, to plates 311b is $e_{bx}$, . . . to plates 311e is $e_{ex}$, while the total instantaneous voltages applied to deflection plates 312a is $e_{ay}$, . . . to plates 312e is $e_{ey}$.

Thus, $e_{ax} = -E_{a0} + 2E_{ak} \sin \theta'$    $e_{ay} = 2E_{ak} \cos \theta'$
$e_{bx} = E_{ak} \sin \theta'$    $e_{by} = -E_{b0} + E_{bk} \cos \theta'$
$e_{cx} = 0$    $e_{cy} = 0$
$e_{dx} = -E_{dk} \sin \theta'$    $e_{dy} = E_{d0} - E_{dk} \cos \theta'$
$e_{ex} = E_{e0} - 2E_{ek} \sin \theta'$    $e_{ey} = -2E_{ek} \cos \theta'$ Here, $E_{a0}$ of the first equation is the D.C. aligning voltage. The subscript $a$ indicates it is the voltage applied to deflection plates of electron gun 305a, while the subscript 0 indicates it is the voltage necessary to bring the beam to the axis. The other D.C. aligning voltages use the same convention. The amplitude of the rotational A.C. voltage is given by $E_{ak}$ where subscripts "$a$" refer to the gun 311a, and "$k$" refers to a displacement $k$ on phosphor screen 303.

Imperfect positioning of the several electron guns and imperfect aligning of their deflection plates require that the several D.C. aligning voltages and the several A.C. rotational voltages be manually adjusted to position as shown on Figures 16B and 16C.

As in the previous embodiment, each three dimensional image is swept out twice for every complete cycle of rotation of the display screen 56 (Fig. 15). In a similar way, each sectional (two dimensional) image of the second three dimensional image of each cycle must be reverted. This is achieved by reversing the direction of the radius (($x$) or horizontal) sweep in the magnetic deflection of the several electron beams 304a to 304e in cathode ray tube 301 (see Fig. 15). Thus, in Fig. 16C the radius (($x$) or horizontal) sweep repeatedly moves all the image generating spots $a$ to $e$, say, from left to right (or from $-x$ to $+x$) to sweep out a sectional image. After screen 56 has rotated 180 degrees, the sectional image shown at Fig. 16F is reverted by changing the polarity of the radius magnetic deflection so that the radius (horizontal or ($x$)) sweep repeatedly moves all the spots $a$ to $e$ from left to right (or from $-x$ to $+x$) again. A change of polarity in the radius magnetic deflection is necessary since magnetic deflection yoke 302 rotates in unison with screen 56.

Referring now to Fig. 17, a servo-generator 221 on generescope 300 driven in unison with screen 56 has its output amplified by servo amplifier 315 which in turn drives servo motor 316. Servo motor 316 is mechanically linked to screen position indicating sine and cosine potentiometers 60 and 61 respectively. The balanced output of sine potentiometer 60 is applied to all the radius ($x$) alignor circuits 317a to 317e, while the balanced output of cosine potentiometer 61 is applied to all the height ($y$) alignor circuits 318a to 318e. Each of the radius ($x$) alignor circuits 317a to 317e has a pair of manual controls, A.C. rotation controls 319a to 319e and D.C. alignment control 320a to 320e. Each of the height ($y$) alignor circuits 318a to 318e also has an A.C. rotation control 321a to 321e and a D.C. alignment control 322a to 322e. Fig. 18 shows the radius ($x$) alignor circuit 317a which is representative of any of the range or height alignor circuits 317a to 317e and 318a to 318e. The radius alignor circuit 317a comprises a pair of dual potentiometers 323 and 324. Potentiometer 323, as well as 324, has two series connected sections wherein each section has its own "pick off" arm. It will be observed that the "pick off" arms for each potentiometer are ganged together. The ends of potentiometers 323 are connected to the balanced output of sine potentiometer 61 and the ends of potentiometer 324 are connected to a suitable D.C. potential. The "pick off" arms of the top sections of potentiometers 324 are connected together via capacitor 324u and tuned circuit 325u. Similarly, the "pick off" arms of the lower sections are connected together via capacitor 324L and tuned circuit 325L. Outputs from alignor 317 are taken at the junctions of elements 324u and 325u as well as 324L and 325L.

The A.C. control 319a can be adjusted to pick off on potentiometer 323 voltage $E_{ak} \sin \theta'$ from $E_2 \sin \theta'$ simultaneously with voltage $-E_{ak} \sin \theta'$ from $-E_2 \sin \theta'$ since $E_2$ is made greater than $E_{ak}$. In the same way, $-\frac{1}{2}E_{a0}$ and $\frac{1}{2}E_{a0}$ may be picked off on potentiometer 324 so that the total balanced output, $e_{ax} = -E_{a0} + 2E_{ak} \sin \theta'$, is sent to electrostatic deflection electrode 311a in cathode ray tube 301 in generescope 300. The capacitors 324u and 324L and the parallel tuned circuits 325u and 325L isolate the potentiometers 323 and 324 from each other. Each of the alignor circuits has a balanced output that goes to its corresponding electrostatic deflection plates 311a to 311e and 312a to 312e of cathode ray tube 301 as schematically illustrated in Fig. 17 to which reference is again made. The output leads from each alignor circuit represents a balanced output just described.

The potentiometer 60 sends its sinusoidal signal that is synchronous with the rotation of screen 56 to frequency multiplier 326. This in turn controls the period, $\tau$, of the height ($y$) synchronizer 327 output pulses that trigger height sweep 328. The frequency multiplier 326 also feeds into another frequency multiplier 329 that controls the period, $s$, of the radius (or horizontal ($x$)) synchronizer 330.

Synchronizer 330 output pulses are fed into both direct sync gate 370D and reverse sync gate 370R. When $\theta'$, the screen 56 bearing angle is between 0 and 180 degrees, $0 \leq \theta' < 180°$, the direct sync gate 370D is a permissor (or conducts) and reverse sync gate 370R is an inhibitor. When $\theta'$ is between 180 and 360 degress, $180° \leq \theta' < 360°$, the direct sync gate 370D is an inhibitor and reverse sync gate 370R is a permissor (or conducts). The operation of these gates 370D and 370R will be further described below.

When $\theta'$ is between 0 and 180 degrees, the sync pulses pass through only direct sync gate 370D to direct radius ($x$) sweep 331D where they trigger radius sweeps. The outputs of the height ($y$) sweep 328 and the direct radius ($x$) sweep 331D are transmitted through slip ring assembly 309 to height(($y$) or vertical) coil and a radius (($x$) or horizontal) coil respectively (coils not shown) of the magnetic deflection yoke 302. When $\theta'$ is between 180 and 360 degress, the sync pulses pass through only reverse radius gate 370R to reverse radius ($x$) sweep 331R where they trigger radius sweeps that are of opposite polarity to those of direct sweep 331D. The outputs of the height ($y$) sweep 328 and the reverse radius ($x$) sweep 331R are now transmitted to the height ($y$) or vertical coil and a radius ($x$) or horizontal coil respectively through slip ring assembly 309. The outputs of the direct and reverse sweeps 331D and 331R respectively being opposite in polarity, the sectional images formed in the second alternation of each cycle of screen 56 are reverted.

The sync gates 370D and 370R are controlled by two square waves that originate in the sinusoidal output of potentiometer 60. This sine wave feeds into square wave generator 371 where it is amplified and clipped into a square wave output synchronous with its sinusoidal input. This square wave is fed into direct sync gate 370D and into square wave inverter 372. Inverter 372 converts its input to a square wave of opposite polarity that is fed to reverse radius gate 370R. The gates 370D and 370R each comprise a dual control grid electronic tube such as the 6AS6. The square waves are applied to the second control grid (the supressor) thereof, so that when a given square wave is positive, the gate it is controlling conducts (or is a permissor) and when it is negative, the gate plate current is cut off and it is an inhibitor. The method described is so similar to the method of reversion in the first embodiment that Fig. 14 may be used here also. Let Fig. 14–1 represent the output of sine potentiometer 60, then the square wave of Fig. 14–2 represents the output of square wave generator 371, and the square wave of Fig. 14–3 represents the output of square wave inverter 372.

Thus, the several signals that align and rotate the individual electron beams 304a to 304e (see Figs. 16A and B) have been accounted for, as have common magnetic scanning signals for all those beams collectively in cathode ray tube 301. The production of intensity signals for the electron guns 305a to 305e will now be described.

Referring to Fig. 19 which illustrates a moving film reproducer 334 similar in its mechanical aspects to the moving film signal source 149 previously mentioned. This moving film reproducer 334 as its prototype may be operated in three ways. Using a long strip of photographic film 335 so that motion may be exhibited; using a loop of photographic film 335 to produce a stationary three dimensional scene; or a larger loop to exhibit cyclic motion. In all three ways, a servo motor 316 drives sprocket wheels 151 and 151'. The servo motor 316 is controlled by servo generator 221 on generescope 300 through servo amplifier 315 (see Fig. 17), and rotates in close synchronism with screen 56 of generescope 300. Photographic film strip 335 is driven with constant speed through moving film transducer 336 by the action of sprocket wheels 151 and 151'.

The moving film transducer 336 shown in more detail in Fig. 20 in conjunction with Figs. 21A to D is fundamentally a flying spot scanner having five parallel channels. The flying spot scanner cathode ray tube 337 has five electron guns 338a to 338e. Electron guns 338b, 338c, and 338d are shown in the cross sectional view of Fig. 20. In Fig. 21A all five guns 338a to 338e are shown in the top view of the neck of cathode ray tube 337. The electrostatic deflection plates 339b and 340b control the $x$ and $y$ deflection of electron beam 341b. In the same way, the remaining electron beams are individually controlled by their corresponding deflection plates 339a to 339e and 340b to 340e. D.C. (or static) signals are applied to each of these deflection systems so that the electron beams 341a to 341e impinge on phosphor screen 342 at points $a''$ to $e''$. These points $a''$ to $e''$ on the Y axis are equidistant and constitute the quiescent positions of the beams 341a to 341e, as shown in Fig. 21B. Each of the electron guns 338a to 338e have control grids 353a to 353e that are held at fixed values of voltage so that the beam spots $a''$ to $e''$ on screen 342 produce luminous spots of equal intensity.

A magnetic deflection yoke 343 applying common horizontal (radial ($x$)) and vertical (height ($y$)) magnetic scanning fields to the several electron beams 341a to 341e would sweep out the scanned field 344 (Fig. 21B) on phosphor screen 342 if film 335 were stationary. This scanned field 344 optically projected by lens 345 falls on photographic film 335 to coincide with a frame 346 (see Fig. 21C) that depicts a section of a three dimensional scene. Accordingly, spots $a''$ to $e''$ of screen 342 are focussed at spots $a'''$ to $e'''$ on frame 346 of film 335.

The scanned field 344 (Fig. 21B) is composed of scanned sections 344a to 344e, each of which is swept by beams 341a to 341e respectively. However, film 335 moves and in the period, $\tau$, of a single scanned field 344 is displaced the height of a single frame 346. The scanned field 344 also moves so that its optical projection remains on a given frame 346. This is affected by adding a component to the vertical deflection magnetic field to displace the scanned field 344 by its own height or four-fifths its own height corresponding to a vertical scan of a frame 346 that is in the same or opposite direction to the motion of film 335. Thus, $U_1L_1$, is the height of a stationary scanned field 344, and $U_2L_2$ is the height of a displaced scanned field 344 accommodating the motion of film 335. Moreover, $U_2L_2 = 2U_1L_1$, if the projected vertical scan starts at the top of frame 346 and travels downward over the frame; or $U_2L_2 = 1/5U_1L_1$, if the projected vertical scan starts toward the bottom of the frame and travels upward.

A projected scanned field of light 352 (Fig. 20) that is of constant intensity is transmitted to photographic film 335 where it is intensity modulated by the variable density of a sectional view recorded on each frame 346 of film 335 (Fig. 21C). This modulated light 352' is projected by lens 347 to form an intensity modulated image of the scanned field on a photo-electric target 348 of image dissector tube 349. This tube 349 has five electron multipliers 350a to 350e, each having an orifice 351a to 351e, respectively (Fig. 21D). The electron multipliers 350a to 350e are aligned so that their common axis falls on a centerline that is on the perpendicular projection of the image of the Y axis on target 348 of scanned field 344. The orifices 351a to 351e (Fig. 21D) are equidistant with a common value $d$ that is equal to the distance between adjacent images $a^{IV}$ to $e^{IV}$ on target 348 of the quiescent points $a''$ to $e''$ on screen 342. The light 352 from the quiescent points $a''$ to $e''$, on screen 342 is projected by lens 345 and lens 347 on to points $a^{IV}$ to $e^{IV}$ of photoelectric target 348 of image dissector tube 349. The normal operation of the electrostatic accelerating field of dissector tube 349 is to direct electrons 354a to 354e emitted at points $a^{IV}$ to $e^{IV}$ from photoelectric target 348 due to the modulated incident light 352' into orifices 351a to 351e of electron multipliers 350a to 350e. The number of electrons emitted at a given spot is proportional to the luminous flux 352' incident to target 348. Since the incident luminous flux 352' has been modulated by the grain density of photographic film 335 through which it passed, the number of electrons emitted is also so modulated. The electrons 354a to 354e from spots $a^{IV}$ to $e^{IV}$ enter orifices 351a to 351e respectively, whence they pass through photomultipliers 350a to 350e where they are multiplied, effectively by a constant factor, so that output intensity signals $I_a$ to $I_e$ are a measure of film 335 density of corresponding spots $a'''$ to $e'''$ on frame 346.

When the spots $a^{IV}$ to $e^{IV}$ on target 348 correspond to quiescent spots $a''$ to $e''$ on screen 342, electrons 354a to 354e are directed into orifices 351a to 351e respectively through the normal action of electrostatic accelerating fields of image dissector tube 349. The application of horizontal (radial ($x$)) and vertical (height ($y$)) sweep signals to deflection yoke 343 of flying spot scanner 337 establish common magnetic fields that sweep the several electron beams 341a to 341e through the scanned field 344 such that spots $a''$ to $e''$ sweep out scanned sections 344a to 344e respectively, and of course, so that the scanned field 344 moves vertically to accommodate the motion of film 335. In a corresponding way, the images $a^{IV}$ to $e^{IV}$ of spots $a''$ to $e''$ sweep out scanned sections that comprise a scanned field that moves vertically on the photoelectric target 348 of image dissector tube 349. However, in dissector tube 349, a horizontal (radial ($x$)) deflection coil 355 and vertical deflection (height ($y$)) coil 356 produce common magnetic fields that are proportional in magnitude but opposite in sense to the scanning fields produced by yoke 343 so that electrons 354a to 354e from corresponding scanned sections of target 348 are directed into the orifices 351a to 351e of multipliers 350a to 350e. A focus coil 357 aids this action. The signals $i_a$ to $i_e$ at the output of multipliers 350a to 350e correspond to scanned sections of frame 346 of film 335.

The moving film transducer 336 is a flying spot film scanner of five channels. If it were a single channel, a commercial flying spot cathode ray tube such as the Du Mont K1254 along with a multiplier phototube such as the 6291 for a sensing means could be used. However, the multiple electron gun tube 337 (as well as 301) requires individual electrostatic deflection systems as well as a common magnetic deflection system. The Du Mont K1202P, a cathode ray tube with both electrostatic deflection and provision for magnetic deflection has single electron gun. The cathode ray tube 337 (and 301) with multiple electron guns having individual electrostatic deflection systems with provision for a common magnetic deflection constitutes invention that advances the cathode ray tube art.

The image dissector tube 349 is used in place of a single multiplier phototube also because there are five channels in the flying spot scanner. The Farnsworth D(30)TR image dissector is a single channel image dissector tube. Image dissector tube 349 with its multiple electron multipliers and common magnetic deflection system constitutes invention that advances the art of video sensing devices. The apertures 351a to 351e of multipliers 350a to 350e need not be made small, i.e., 30 mils as in the D(30)TR Farnsworth image dissector, since the definition of a scanned frame 346 depends on the size of the scanning spots a''' to e''', and not on the size of the apertures 351a to 351e.

A frame 346 of photographic film 352 (Fig. 21C) depicts a section of a three dimensional scene. The recorded data on a frame 346 is different from that of a field of the first embodiment (see Fig. 13A) where the data of the range, height, and intensity are recorded separately. Each element of area of frame 346 by its position and density represents the range, height, and intensity of a corresponding element of a section of a three dimensional scene. The recording is made opaque and of varying degrees of translucency, that is, the film is opaque except where a trace 358 of a sectional view occurs and the clarity of the translucent trace is a measure of the intensity. The heavy spots S can be a photograph recording of radar range-height display and represent the position of aircraft. The trace 358 can be the outline of a section of a city and can have been photographed from a drawing. The combination can be effected by superimposing the two exposures.

A series of 180/$\Delta\theta'$ frames comprises a division that can produce a single three dimensional image. A loop of film 335 consisting of a division of frames may be used in moving film reproducer 334 to exhibit stationary three dimensional scenes in generescope 300. A larger loop of film 335 consisting of 2N divisions (N blocs) can be employed to exhibit cyclic motion or action where the action repeats every N three dimensional scenes. A long strip of film 335 may be used to exhibit motion that is not cyclic.

Referring back to Fig. 17, the height synchronizer 327 and radius synchronizer 330 not only send sync pulses to the height sweep 328 and the radius sweep 331D and 331R respectively, but also to height ($y$) sweeps 359 and 360 as well as the radius ($x$) sweeps 361 and 362. The sweeps 360 and 362 drive the vertical (height ($y$)) coil, and the horizontal (radius ($x$)) coil respectively of magnetic deflection yoke 343 on the flying spot scanner 337. The sweeps 359 and 361 drive the vertical (height or ($y$)) deflection coil 356 and the horizontal (radius or ($x$)) deflection coil 355 respectively of dissector tube 349. All three scanned fields, that of flying spot scanner tube 337, image dissector tube 349, and projection cathode ray tube 301 are synchronous and pertain to a given frame such as 346 of film 335. The signals $I_a$ to $I_e$ from the outputs of image dissector tube 349 are fed into intensity amplifiers 363a to 363e respectively. The signals are amplified and sent on to the control electrodes 364a to 364e of electron guns 305a to 305e of cathode ray tube 301 (see Fig. 15) where they intensity modulate the images formed.

Static controls 365 are comprised of fifteen control sectors (potentiometers) each having a manual adjustment knob 366xa to 366xe; 366ya to 366ye and 366ia to 366ie. Control sectors 365xa to 365xe supply adjustable fixed voltages to the radius ($x$) deflection plates 339a to 339e respectively of the several guns of flying spots scanner tube 337 (see Fig. 21A); control sectors 365ya to 365ye supply fixed voltages to the height ($y$) deflection plates 340a to 340e of tube 337; these voltages control the quiescent positions a'' to e'' of electron beams 341a to 341e respectively in scanner tube 337 (see Fig. 20). Control sectors 365ia to 365ie supply fixed voltages to scanner tube 337, control grids 353a to 353e (Fig. 20) respectively, to adjust all spots a'' to e'' on screen 342 (Fig. 21B) to the same unmodulated intensity. These intensity control voltages are applied to scanner tube 337 through blanking circuits 366 that cuts off the electron guns 338a to 338e during flyback of the sweeps which are also applied to blanking circuits 366 from height sweep 360 and radius sweep 362.

The sweep circuits in Fig. 17, 238, 331D, 331R, 359 360, 361, and 362, are saw tooth generators well known in the television and radar arts. All the radius ($x$) sweeps 331D (or 331R) 361, and 362 are synchronous with radius ($x$) sweeps 331D and 331R alternating each half cyle as described above. All the height ($y$) sweeps 328, 359, and 360 are also synchronous. The height ($y$) sweeps 359 and 360 not only affect the scanning of film 335 (see Fig 20) but also must accommodate the motion of the film 335. No change in the nature of the sweep output is needed for the second condition (the film motion) as only the amplitude of the saw tooth sweep is affected. While the saw tooth sweeps are employed here, other equivalent forms, i.e., trapezoidal radius (($x$) or horizontal) sweeps and stepped height (($y$) or vertical) sweeps could be employed to minimize the blanked portions of the sweeps.

The blanking circuits 366 comprising sections 366a to 366e, again employing the well known methods of television, convert the "flyback" portion of the saw tooth sweeps from height and radius sweep ciruits 360 and 362 respectively into negative pulses that are combined with the static intensity voltages from static controls sectors 365ia to 365ie to reduce the grids 353a to 353e of scanner 337 (see Fig. 20) below cutoff to affect blanking during the "flyback" of the magnetic deflection. This blanking is effective not only for the transducer 336, but also for generescope 300. That is, the reduced amplitude of the signals fed into control grids 364a to 364e of cathode ray tube 301 when scanner 337 is cut off, extinguishes tube 301 also.

The triangular forms such as 373, and 374I indicate cabling as a device to show conveniently on the diagram the connections of a number of connectors.

The rotated swept field 313 (see Fig. 16C) employed with generescope 300 permits the exhibition of sections of three dimensional scenes recorded on frames 346 (see Fig. 21C) of photographic film 335. The above method is more general than that disclosed in this embodiment. The data of each of the sections can also be recorded on cathode ray storage tubes. This data can then be reproduced by scanning the storage tubes synchronously with the rotated swept field 313 of generescope 300. The data for each of the sections can also be recorded on matrix frames of magnetic storage cores (and their equivalents), such as are used in digital computers. Again, the data can be reproduced by scanning the matrix frames synchronously with the rotated swept field 313 of generescope 300.

Having thus described my invention, I claim:

1. An apparatus for the exhibition of three dimensional images in a volume comprising a rotatable viewing screen for sweeping out said volume, an image producing means responsive to signals for producing two dimensional images, said image producing means being fixed in position, a rotatable projection apparatus interposed between said image producing means and said screen for projecting said images from said image producing means onto said screen, and said projection apparatus being adapted to rotate in unison with said screen.

2. The apparatus defined in claim 1 further including a repetitive signalling means coupled to said image producing means for generating in synchronism with said rotating screen signals representing the position and intensity of elements of an image in a volume.

3. The apparatus defined in claim 2 wherein said repetitive signalling means comprises a plurality of groups of synchronous sampling circuits, each group of sampling circuits being adapted to receive a set of temporally sustained input signals which determine the position and brightness of an image in said volume and operates to convert said sustained signals into pulse signals when the position of said image determined by said input signals and the position of the screen are in a predetermined relation, and a screen position indicating means coupled to said sampling circuits and to said screen for initiating the operation of said sampling circuits.

4. The apparatus defined in claim 2 wherein said repetitive signalling means comprises a signal source including a movable film strip divided into a plurality of parallel tracks, each track storing data for at least one of the characteristics defining elements of images, detection means associated with said film strip, means for moving said film strip past said detection means in synchronism with said screen, said detection means converting said data in all tracks into electrical signals, and means for coupling said electrical signals to said image producing means.

5. The apparatus defined in claim 4 wherein said film strip comprises a plurality of frames, each frame storing data in the tracks thereof defining one diametrical section of the three dimensional image displayed in the volume swept out by said screen.

6. The apparatus defined in claim 1 further comprising an image rotation means coupled to said image producing means for rotating said image on said image producing means in synchronism with the movement of said screen and in the same sense whereby the projections of the rotated images preserve their orientation on said screen.

7. The apparatus defined in claim 6 comprising a source of signals defining an image coupled to said image producing means, said source comprising a movable record bearing medium containing recorded data defining a plurality of sections of three dimensional scenes and objects, and a transducer coupled to said image producing means and associated with said record bearing medium for converting said data thereon into electrical signals.

8. The apparatus defined in claim 6 wherein said image producing means comprises a cathode ray tube.

9. The apparatus defined in claim 6 wherein said image producing means comprises a cathode ray tube having a plurality of separate electron guns, each gun generating a beam of electrons and an electron sensitive target screen associated with said guns, each said gun having separate electrostatic deflection control means, and said image rotation means includes a common electromagnetic deflection control means at said cathode ray tube providing a second and common deflection control means for all said beams.

10. The apparatus defined in claim 9 further including means coupled to said electromagnetic deflection means for causing it to rotate about said cathode ray tube in unison with the rotation of said viewing screen.

11. The apparatus defined in claim 10 further including a pair of sweep generators connected to said common deflection means for causing each of said beams to scan an area of said target screen in a period that is a small fraction of the period of rotation of said viewing screen, whereby each of the scanned areas rotates around a quiescent position of each beam in synchronism with the rotation of said viewing screen; and further including a plurality of pairs of aligning circuits, each of said circuits having A.C. and D.C. outputs and two control elements for adjusting each of said outputs, each pair of circuits being coupled to one of said separate deflection means, said outputs being adjustable to orient the quiescent positions of said beams and said scanned areas such that the areas scanned by each beam are substantially exclusive and in contiguous sequence to form a substantially continuous composite scanned area during a scan period, and to rotate the quiescent positions of said beams in synchronism with the rotation of said viewing screen while maintaining said orientation.

12. The apparatus defined in claim 9 further including a plurality of pairs of alignment circuits, each pair of circuits being connected to a separate electrostatic deflection control means, and producing voltages having D.C. and A.C. components for positioning and rotating each of said electron beams in unison with the rotation of said viewing screen, and a pair of sweep generator means connected to said electro-magnetic deflection means to cause a common sweeping of said beams.

13. The apparatus defined in claim 9 further comprising a moving film scanner including a film strip storing data representing images, a plurality of electrical transducing means associated with one section film at a time, each said transducing means being associated with only a portion of said section of film, for scanning its associated portion of film and producing electrical signals in response to the data thereon, and transfer means coupling the outputs of each of said transducing means to a different one of said electron guns.

14. The apparatus defined in claim 6 wherein said image rotation means comprises a computing means adapted to receive data defining the position in terms of cylindrical coordinates $(x, y, \theta)$ of an object element in a second volume, said computing means processing said received data into output data defining the position in terms of a corresponding second set of cylindrical coordinates $(x_0, y_0, \theta')$ of an image element corresponding to said object element, with output data representing $(x_0, y_0)$ defining the position of said image element on a plane determined by $\theta'$, said position of the image element being rotated on said plane from the corresponding position of said object element by an angle equal to $\theta$.

15. The apparatus defined in claim 14 wherein said computing means comprises two sine and two cosine potentiometers, each potentiometer comprising a pair of fixed end terminals and a movable intermediate contact, wherein all the intermediate contacts are ganged and movable together, driving means coupled to said screen and to said contacts for moving said contacts in synchronism with the movement of said screen, each of said potentiometers being adapted to receive at said pair of end terminals signals representing plus and minus values of a coordinate of an element in an object space, first and second summing devices operating in ananlog form, each summing device having two inputs and one output, said first summing device being connected at its inputs to the movable contacts of a first cosine potentiometer and a first sine potentiometer, said second summing device being connected at its inputs to the movable contacts of a second sine and a second cosine potentiometer, and said outputs of said summing amplifiers being coupled to said image producing means.

16. The apparatus defined in claim 14 wherein coordinates $x$ and $y$ are taken parallel and perpendicular to an axis respectively, said computing means produces output data defining the coordinates $(x_0 y_0 \theta')$ of said image element according to the relations, $$x_0 = x \cos \theta' - y \sin \theta' \text{ and } y_0 = x \sin \theta' + y \cos \theta'$$

and $\theta'$ is proportional to $\theta$.

17. The apparatus defined in claim 16 further including a coupling connected between said screen and said computing means for indicating the angle of said screen at any instant, said computing means receiving signals of very short duration defining said coordinates $(x, y)$ at the time when the screen angle is equal to said coordinate $\theta$ and converting received signals into output signals of very short duration defining said coordinates $(x_0, y_0)$ in such a short time that said screen has negligible movement, the screen angle at the time the output signals are produced being equal to $\theta'$ wherein $\theta'$ is approximately equal to $\theta$.

18. The apparatus defined in claim 17 wherein said image producing means comprises a cathode ray tube having a plurality of electron guns, said computing means having a plurality of parallel channels, each channel being coupled to said rotatable screen and adapted to receive different sets of input signals representing coordinates x and y of different object elements, each channel producing a pair of output signals representing coordinates $x_0$ and $y_0$, in response to said input signals and means coupling each pair of output signals to a different electron gun in said cathode ray tube, whereby said apparatus exhibits three dimensional images that concurrently display the elements determined by signals from the several channels.

19. The apparatus defined in claim 17 further including a switching and inverting means coupled to the input of said computing means for receiving said signal representative of the coordinate x and transmitting said signal to said computing means in substantially the same form as received or in the inverted form of a signal representative of coordinate $-x$, and adapted to receive first and second control signals, said first control signal being received when $\theta'=\theta$ and said second control signal being received when $\theta'=\theta+180$, said switching and inverting means transmitting the signal representative of the coordinate x in the same or inverted form in response to said first and second signals respectively; said computing means operating twice for each complete revolution of said screen for each object element producing output signals according to the equations, $x_0 = x \cos \theta' - y \sin \theta'$ and $y_0 = x \sin \theta' + y \cos \theta'$ when $\theta'=\theta$ and producing another set of output signals according to the equations $x_0 = -x \cos \theta' - y \sin \theta'$ and $y_0 = -x \sin \theta' + y \cos \theta'$ when $\theta' = \theta + 180°$.

20. The apparatus defined in claim 19 including a repetitive signalling means for producing in synchronism with said rotating screen signals indicative of the attributes of elements in a volume and control signals, said signalling means being coupled to said image producing means for sending signals indicative of the attributes of intensity, said signalling means being coupled to said switching and inverting means for sending signals indicative of the x coordinates and control signals, and being coupled to said computing means for sensing signals indicative of the y coordinates.

21. The apparatus defined in claim 19 wherein said switching and inverting means comprises an electrical circuit having two mutually exclusive signal paths, said first path including a first coincidence gate having two inputs and an output and connected to receive at its inputs said first control signal and said signal representing coordinate x and connected at its output to said computing means and said second path comprising a second coincidence gate having two inputs and an output and an inverting amplifier connected at its input to the output of said second gate and connected at its output to said computing means, said second coincidence gate being connected to receive at its inputs said second control signal and said signal representing coordinate x.

22. In a three dimensional display apparatus, a cathode ray tube having a plurality of separate electron guns, each gun responsive to electrical stimulus for generating a beam of electrons, an electron sensitive target screen associated with said guns, a separate deflection control means operatively associated with each of said electron guns for controlling the position of the electron beam generated by its associated electron gun and a second and common deflection control means associated with said cathode ray tube operating on all said beams.

23. The apparatus defined in claim 22 further including a pair of sweep generators coupled to said common deflection means for causing each of said beams to scan an area of said target screen; and a plurality of pairs of aligning circuits, each circuit producing a control voltage and comprising a control element for varying said control voltage, each pair of said circuits being coupled to one of said separate deflection means for adjusting the quiescent position of its associated beam whereby the scanned areas of each beam are positioned to be substantially exclusive and in contiguous sequence to form a substantially continuous composite scanned area on said target screen.

24. In a display apparatus wherein three dimensional images are exhibited in accordance with electrical signals, a moving film scanner for generating said electrical signals comprising a variable density translucent film strip divided into frames upon which sequential pictorial cross-sections of three dimensional images are recorded; transducing means astride said film comprising a multiple moving spot generator on one side of said film strip for generating a plurality of moving beams of light directed through a frame on said film, a composite means on another side of said film strip including a plurality of detecting elements, each detecting element responsive to one of said plurality of beams of light through said film for producing electrical signals the intensity of which varies in accordance with the amount of light received thereby and means for moving said film past said composite detecting means.

25. The apparatus defined in claim 24 wherein said composite means comprises a common light sensitive element interposed between said detecting elements and said strip for converting said beams of light passed through said film strip into beams of electrons and further including alignment and sweep means connected to said multiple moving spot generator for causing each of said light beams to scan a predetermined area of a frame, each of said areas being substantially separate and in an adjoining series to cover said frame, said alignment and sweep means comprising apparatus for synchronizing said scanning with the movement of said film; and tracking means associated with said detecting elements for directing one of said beams of electrons into each of said detecting elements.

26. In an apparatus for exhibiting three dimensional images the combination comprising a cathode ray tube having a plurality of electron guns, a memory having a plurality of sections for storing data representing images, a plurality of reading means associated with one section of said memory at a time, each said reading means being associated with only a portion of said section of the memory for scanning its associated portion and producing electrical signals in response to data thereon, and transfer means coupling the outputs of each said reading means to a different one of said electron guns.

27. In an apparatus for displaying an image, an image dissector tube comprising a photo-electric target plate, said target plate comprising sections and having means for receiving a modulated light beam on each of its sections and emitting electrons in response to said light beams, a separate electron multiplier associated with each section of said photoelectric target plate for receiving electrons from its associated section of said plate and common electromagnetic deflection means for directing electrons from each of said sections to its associated electron multiplier.

28. An apparatus for the exhibition of three dimensional images in a volume comprising a rotatable viewing screen for sweeping out said volume, wherein the axis of rotation of said screen is substantially parallel to the surface of said screen, an image producing means responsive to electrical signals for producing two dimensional images, said image producing means being fixed in position, a rotatable optical projection apparatus interposed between said image producing means and said screen for projecting said images from said image producing means onto said screen, and said projection apparatus being adapted to rotate in unison with said screen.

29. In an apparatus for displaying an image, an image dissector tube comprising a photo electric target plate for emitting electrons in response to light beams, means for generating a plurality of modulated light beams, means for directing each one of said beams to a different section of said plate and for causing each beam to scan one section of said plate, a separate electron multiplier associated with each section of the photo electric target plate for receiving electrons from its associated sections, and common electro-magnetic deflection means for directing electrons from each of said sections to its associated electron multiplier as the light beams scan said target plate.

References Cited in the file of this patent

UNITED STATES PATENTS

| | | |
|---|---|---|
| 2,072,527 | Nicolson | Mar. 2, 1937 |
| 2,361,390 | Ferrill | Oct. 31, 1937 |
| 2,604,607 | Howell | July 22, 1952 |